(12) United States Patent
Kurotani et al.

(10) Patent No.: US 10,247,113 B2
(45) Date of Patent: Apr. 2, 2019

(54) CONTROL APPARATUS FOR INTERNAL COMBUSTION ENGINE

(71) Applicant: HONDA MOTOR CO., LTD., Tokyo (JP)

(72) Inventors: Tadashi Kurotani, Wako (JP); Kenji Shigetoyo, Wako (JP); Kohei Kuzuoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 33 days.

(21) Appl. No.: 15/420,097

(22) Filed: Jan. 31, 2017

(65) Prior Publication Data

US 2017/0241352 A1    Aug. 24, 2017

(30) Foreign Application Priority Data

Feb. 22, 2016    (JP) .................. 2016-031304

(51) Int. Cl.

| F02B 13/00 | (2006.01) |
| F02D 19/08 | (2006.01) |
| F02D 19/06 | (2006.01) |
| F02D 41/14 | (2006.01) |
| F02D 41/30 | (2006.01) |

(Continued)

(52) U.S. Cl.
CPC ....... F02D 19/081 (2013.01); F02D 19/0649 (2013.01); F02D 19/0655 (2013.01); F02D 35/025 (2013.01); F02D 35/027 (2013.01); F02D 41/009 (2013.01); F02D 41/0025 (2013.01); F02D 41/1497 (2013.01); F02D 41/1498 (2013.01); F02D 41/3094 (2013.01); F02P 5/1527 (2013.01); F02D 19/0692 (2013.01); *F02D 2041/389* (2013.01); *F02D 2200/025* (2013.01); *F02D 2200/0406* (2013.01); *F02D 2200/0602* (2013.01); *F02D 2250/26* (2013.01); *Y02T 10/36* (2013.01); *Y02T 10/46* (2013.01)

(58) Field of Classification Search
CPC ............... F02D 19/081; F02D 19/0655; F02D 41/0025; F02D 35/027; F02D 35/025; F02D 41/1497; F02D 41/1498; F02D 19/0649; F02D 41/3094; F02D 41/009; F02D 19/0692; F02D 2200/06; F02P 5/1527; Y02T 10/46
See application file for complete search history.

(56) References Cited

FOREIGN PATENT DOCUMENTS

| JP | 2000179368 A | * | 6/2000 |
| JP | 2005-155469 | | 6/2005 |
| JP | 2014-074337 | | 4/2014 |

* cited by examiner

*Primary Examiner* — Hung Q Nguyen
(74) *Attorney, Agent, or Firm* — Mori & Ward, LLP

(57) ABSTRACT

A control apparatus for an internal combustion engine, includes circuitry. The circuitry is configured to control a ratio of an amount of low octane number fuel to be supplied to a cylinder to a total amount of the low octane number fuel and a high octane number fuel to be supplied to the cylinder in order to control an overall octane number of fuel to be supplied to the cylinder. The high octane number fuel has a second octane number higher than a first octane number of the low octane number fuel. The circuitry is configured to calculate a maximum octane number of the fuel to be supplied into the cylinder. The circuitry is configured to restrict a power generated by the internal combustion engine based on the maximum octane number.

11 Claims, 11 Drawing Sheets

(51) Int. Cl.
  *F02P 5/152*   (2006.01)
  *F02D 41/00*   (2006.01)
  *F02D 35/02*   (2006.01)
  *F02D 41/38*   (2006.01)

CONTROL APPARATUS FOR INTERNAL COMBUSTION ENGINE

CROSS-REFERENCE TO RELATED APPLICATIONS

The present application claims priority under 35 U.S.C. § 119 to Japanese Patent Application No. 2016-031304, filed Feb. 22, 2016, entitled "Control Apparatus for Internal Combustion Engine." The contents of this application are incorporated herein by reference in their entirety.

BACKGROUND

1. Field

The present disclosure relates to a control apparatus for an internal combustion engine.

2. Description of the Related Art

Control apparatuses disclosed in Japanese Unexamined Patent Application Publication No. 2005-155469 and Japanese Unexamined Patent Application Publication No. 2014-074337 have hitherto been known as control apparatuses of such a type. In the control apparatus disclosed in Japanese Unexamined Patent Application Publication No. 2005-155469, a basic high octane number fuel ratio is calculated on the basis of the rotation speed and the load of the internal combustion engine. The basic high octane number fuel ratio is the basic value of the ratio in amount of high octane number fuel with respect to the total amount of low octane number fuel and the high octane number fuel, which are to be supplied into a cylinder. In addition, with attention to the fact that knocking of the internal combustion engine is liable to occur with the increasing rate of increase of the load of the internal combustion engine, in order to suppress the knocking, the basic high octane number fuel ratio is subjected to increase correction on the basis of the detected rate of increase of the load of the internal combustion engine to calculate the ratio in amount of the high octane number fuel and the amount of the high octane number fuel to be supplied into the cylinder is controlled on the basis of the calculated ratio in amount of the high octane number fuel.

In the control apparatus disclosed in Japanese Unexamined Patent Application Publication No. 2014-074337, in order to suppress the knocking of the internal combustion engine, the ratio of the amount of high octane number fuel to the amount of low octane number fuel to be supplied into a cylinder is calculated so as to be increased with the increasing load of the internal combustion engine, which is detected, and the amount of the high octane number fuel to be supplied into the cylinder is controlled on the basis of the calculated ratio of the amount of the high octane number fuel. In this case, the amount of the low octane number fuel to be supplied into the cylinder is controlled so that the ratio of the amount of the low octane number fuel to the amount of the high octane number fuel is not decreased to zero even when the load of the internal combustion engine is increased to save the high octane number fuel.

SUMMARY

According to a first aspect of the present invention, a control apparatus for an internal combustion engine in which an octane number of fuel to be supplied into a cylinder is varied by adjusting a ratio in amount of low octane number fuel and a ratio in amount of high octane number fuel having the octane number greater than that of the low octane number fuel with respect to a total amount of the low octane number fuel and the high octane number fuel, which are to be supplied into the cylinder, the control apparatus includes a maximum octane number calculating unit and an output limiting unit. The maximum octane number calculating unit calculates a maximum octane number, which is a maximum value of the octane number of fuel capable of being supplied into the cylinder. The output limiting unit limits an output from the internal combustion engine based on the calculated maximum octane number.

According to a second aspect of the present invention, a control apparatus for an internal combustion engine, includes circuitry. The circuitry is configured to control a ratio of an amount of low octane number fuel to be supplied to a cylinder to a total amount of the low octane number fuel and a high octane number fuel to be supplied to the cylinder in order to control an overall octane number of fuel to be supplied to the cylinder. The high octane number fuel has a second octane number higher than a first octane number of the low octane number fuel. The circuitry is configured to calculate a maximum octane number of the fuel to be supplied into the cylinder. The circuitry is configured to restrict a power generated by the internal combustion engine based on the maximum octane number.

According to a third aspect of the present invention, a control apparatus for an internal combustion engine, includes a controller, a calculator, and a power controller. The controller controls a ratio of an amount of low octane number fuel to be supplied to a cylinder to a total amount of the low octane number fuel and a high octane number fuel to be supplied to the cylinder in order to control an overall octane number of fuel to be supplied to the cylinder. The high octane number fuel has a second octane number higher than a first octane number of the low octane number fuel. The calculator calculates a maximum octane number of the fuel to be supplied into the cylinder. The power controller restricts a power generated by the internal combustion engine based on the maximum octane number.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
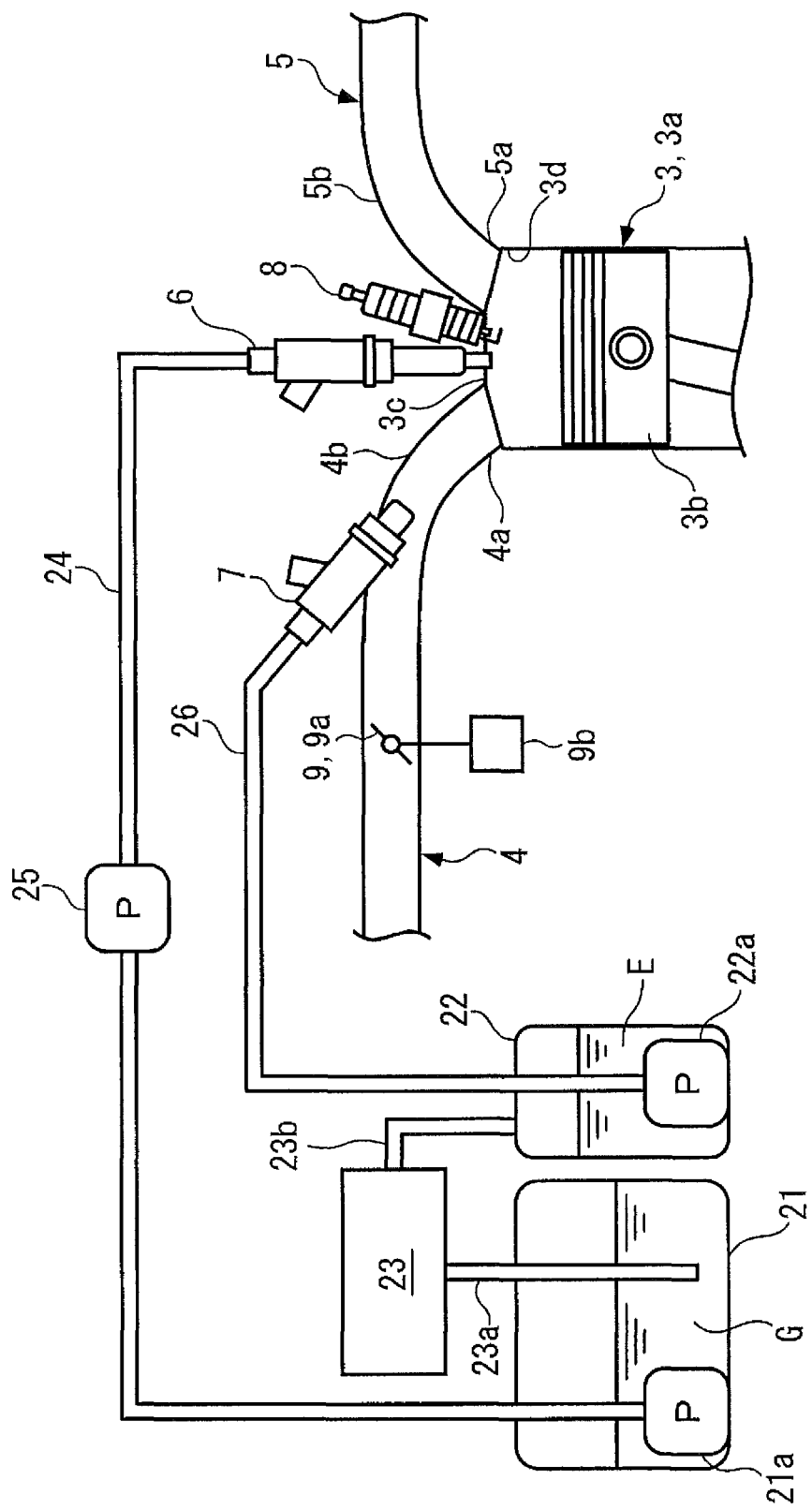
FIG. 1 schematically illustrates an internal combustion engine to which a control apparatus according to an embodiment of the present disclosure is applied.

The embodiments will now be described with reference to the accompanying drawings, wherein like reference numerals designate corresponding or identical elements throughout the various drawings.

Embodiments of the present disclosure will herein be described in detail with reference to the attached drawings. FIG. 1 illustrates an internal combustion engine (hereinafter referred to as an "engine") 3 to which a control apparatus 1 according to an embodiment is applied. The engine 3 is mounted in a vehicle (not illustrated) as a power source of the vehicle. The engine 3 uses both gasoline G, which is low octane number fuel, and ethanol E, which is high octane number fuel. The gasoline G is gasoline on the market, which contains an ethanol component as a high octane number component of about 10%, and is retained in a first fuel tank 21. The ethanol E contains an ethanol component of about 60%, has an octane number greater than that of the gasoline G, and is retained in a second fuel tank 22. As is well known in the art, the concentration of the ethanol component of fuel represents the octane number of the fuel, and the octane number is increased with the increasing concentration of the ethanol component. A low pressure pump 21a is provided in the first fuel tank 21 and a low pressure pump 22a is provided in the second fuel tank 22. The discharge pressure of the fuel with the low-pressure pump 22a is set to predetermined pressure PREF.

In the present embodiment, the ethanol E is produced from the gasoline G with a separation unit 23. The separation unit 23 separates the ethanol component from the gasoline G, which is supplied from the first fuel tank 21 through a passage 23a, to produce the ethanol E and supplies the produced ethanol E to the second fuel tank 22 via a passage 23b. The production and supply operation of the ethanol E to the second fuel tank 22 by the separation unit 23 is controlled by an engine control unit (ECU) 2 described below in the control apparatus 1 (refer to FIG. 2). A method using a separation film or a method using catalyst may be appropriately adopted as the separation method with the separation unit 23.

The engine 3 includes, for example, four cylinders 3a (only one cylinder 3a is illustrated in FIG. 1). A combustion chamber 3d is provided between a piston 3b and a cylinder head 3c of each cylinder 3a. An intake passage 4 is connected to the combustion chamber 3d via an intake port 4a and an intake manifold 4b and an exhaust passage 5 is connected to the combustion chamber 3d via an exhaust port 5a and an exhaust manifold 5b.

An in-cylinder injection valve 6 is provided for the cylinder head 3c for each cylinder 3a and a port injection valve 7 is provided for the intake manifold 4b for each cylinder 3a. An ignition plug 8 for igniting air-fuel mixture composed of the fuel produced in the combustion chamber 3d and air is also provided for the cylinder head 3c for each cylinder 3a.

Each of the in-cylinder injection valve 6 and the port injection valve 7 is a common valve composed of, for example, a solenoid and a needle valve (not illustrated). In the in-cylinder injection valve 6, a tip portion including an injection hole (not illustrated) is arranged so as to be over the combustion chamber 3d. The in-cylinder injection valve 6 is connected to the first fuel tank 21 via a gasoline supply passage 24 and a high-pressure pump 25 provided along the high-pressure pump 25. In the port injection valve 7, a tip portion including an injection hole (not illustrated) is arranged so as to be over the intake port 4a. The port injection valve 7 is connected to the second fuel tank 22 via an ethanol supply passage 26.

With the above configuration, the gasoline G is supplied from the first fuel tank 21 to the in-cylinder injection valve 6 through the low pressure pump 21a and the gasoline supply passage 24 with being increased in pressure with the high-pressure pump 25 and is directly injected from the in-cylinder injection valve 6 into the combustion chamber 3d. The pressure of the gasoline G supplied to the in-cylinder injection valve 6 is capable of being varied through control of the operation of the high-pressure pump 25 with the ECU 2. The ethanol E is supplied from the second fuel tank 22 to the port injection valve 7 through the low-pressure pump 22a and the ethanol supply passage 26 and is injected from the port injection valve 7 to the intake port 4a.

A throttle valve 9 is provided in the intake passage 4. The throttle valve 9 includes a valve body 9a that opens and closes the intake passage 4 and a TH actuator 9b that drives the valve body 9a. The TH actuator 9b is composed of, for example, an electric motor and is connected to the ECU 2. The degree of opening of the throttle valve 9 is varied by the ECU 2 to control the amount of intake air flowing into the cylinder 3a through the intake passage 4.

Figure 2:
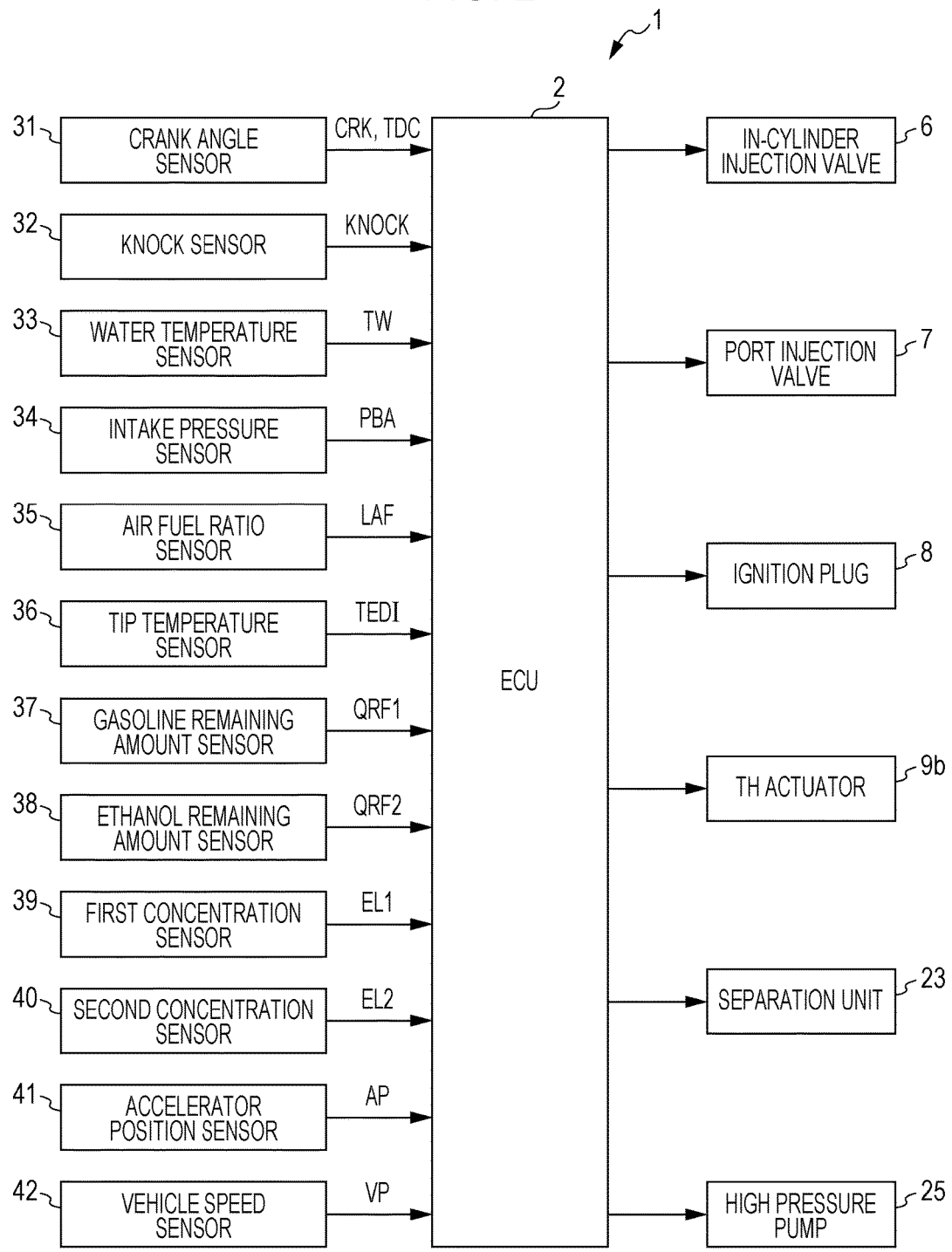
FIG. 2 is a block diagram illustrating an ECU and so on in the control apparatus.

As illustrated in FIG. 2, a crank angle sensor 31, a knock sensor 32, and a water temperature sensor 33 are provided in the engine 3. The crank angle sensor 31 supplies a CRK signal and a TDC signal, which are pulse signals, to the ECU 2 in response to rotation of a crank shaft (not illustrated) (refer to FIG. 2). The CRK signal is output every predetermined rotation angle (for example, every one degree) of the crank shaft (such an angle is hereinafter referred to as a "crank angle"). The ECU 2 calculates a rotation speed of the engine 3 (hereinafter referred to as an "engine rotation speed") NE on the basis of the CRK signal. The TDC signal indicates that the piston 3b is positioned near a top dead center at start of an intake process in any cylinder 3a. When the four cylinders 3a are provided, as in the present embodiment, the TDC signal is output every 180 degrees of the crank angle.

The knock sensor 32 is composed of, for example, a piezoelectric element and is provided in a cylinder block of the engine 3. The knock sensor 32 detects knock strength KNOCK, which is the strength of knocking of the engine 3, and supplies a detection signal of the knock strength KNOCK to the ECU 2. The water temperature sensor 33 detects the temperature of cooling water of the engine 3 (hereinafter referred to as an "engine water temperature") TW and supplies a detection signal of the engine water temperature TW to the ECU 2.

An intake pressure sensor 34 is provided at the downstream side of the throttle valve 9 in the intake passage 4 and an air fuel ratio sensor 35 is provided along the exhaust passage 5. The intake pressure sensor 34 detects intake air pressure PBA, which is the pressure in the intake passage 4, and supplies a detection signal of the intake air pressure PBA to the ECU 2. The ECU 2 calculates an intake air amount QAIR of intake air inhaled into the cylinder 3a by searching a certain map (not illustrated) on the basis of the calculated engine rotation speed NE and the detected intake air pressure PBA. The air fuel ratio sensor 35 detects an air fuel ratio LAF of the air-fuel mixture that has burnt in the combustion chamber 3d and supplies a detection signal of the air fuel ratio LAF to the ECU 2.

In addition, a tip temperature sensor 36 and a cylinder determination sensor (not illustrated) are provided in the engine 3. The tip temperature sensor 36 is composed of, for example, a thermistor. The tip temperature sensor 36 detects a tip temperature TEDI, which is the temperature of an injection hole portion of the in-cylinder injection valve 6, and supplies a detection signal of the tip temperature TEDI to the ECU 2. The cylinder determination sensor supplies a cylinder determination signal, which is a pulse signal for determining the cylinder, to the ECU 2. The ECU 2 calculates an actual crank angle position, which is the actual rotation angle position of the crank shaft, using the cylinder determination signal, the CRK signal, and the TDC signal for each cylinder 3a. In this case, the actual crank angle position is calculated as the rotation angle position of the crank shaft based on the TDC signal of each cylinder 3a and is set to a value of zero upon an occurrence of the TDC signal.

A gasoline remaining amount sensor 37 is provided in the first fuel tank 21 and an ethanol remaining amount sensor 38 is provided in the second fuel tank 22. The gasoline remaining amount sensor 37 detects the amount of the gasoline G retained in the first fuel tank 21 (hereinafter referred to as a "gasoline remaining amount") QRF1 and supplies a detection signal of the gasoline remaining amount QRF1 to the ECU 2. The ethanol remaining amount sensor 38 detects the amount of the ethanol E retained in the second fuel tank 22 (hereinafter referred to as an "ethanol remaining amount") QRF2 and supplies a detection signal of the ethanol remaining amount QRF2 to the ECU 2.

A first concentration sensor 39 is provided in the first fuel tank 21 and a second concentration sensor 40 is provided in the second fuel tank 22. The first concentration sensor 39 and the second concentration sensor 40 are of, for example, an electrostatic capacitor type. The first concentration sensor 39 detects the concentration of the ethanol component contained in the gasoline G retained in the first fuel tank 21 (hereinafter referred to as "first ethanol concentration") EL1 and supplies a detection signal of the first ethanol concentration EL1 to the ECU 2. The second concentration sensor 40 detects the concentration of the ethanol component contained in the ethanol E retained in the second fuel tank 22 (hereinafter referred to as "second ethanol concentration") EL2 and supplies a detection signal of the second ethanol concentration EL2 to the ECU 2. Other appropriate sensors, for example, optical sensors may be used as the first and second concentration sensors 39 and 40.

A detection signal indicating the amount of operation of an accelerator pedal (not illustrated) of the vehicle (hereinafter referred to as an "accelerator position") AP is supplied from an accelerator position sensor 41 to the ECU 2. A detection signal indicating a vehicle speed VP of the vehicle is supplied from a vehicle speed sensor 42 to the ECU 2.

The ECU 2 is composed of a microcomputer including a central processing unit (CPU), a random access memory (RAM), a read only memory (ROM), an input-output (I/O) interface, and so on (not illustrated). The ECU 2 controls the fuel injection time and the injection timing of each of the in-cylinder injection valve 6 and the port injection valve 7, the ignition timing of the ignition plug 8, and the degree of opening of the throttle valve 9 in accordance with control programs stored in the ROM on the basis of the detection signals supplied from the various sensors from the crank angle sensor 31 to the vehicle speed sensor 42 described above. The ECU 2 also controls the operations of the separation unit 23 and the high-pressure pump 25 described above.

Figure 3:
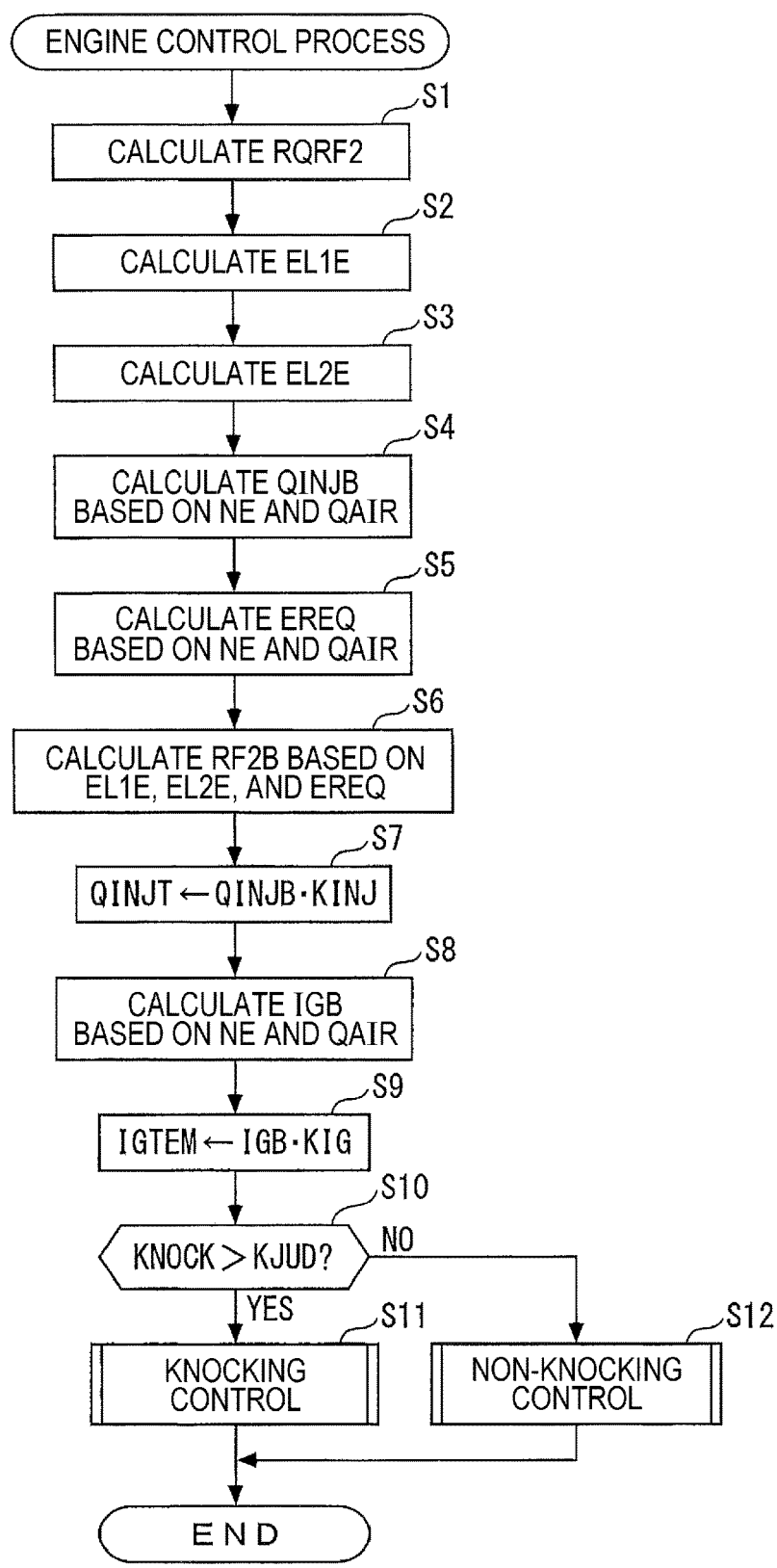
FIG. 3 is a flowchart illustrating an engine control process performed by the ECU.

Processes performed by the ECU 2 will now be described with reference to FIG. 3 to FIG. 10. FIG. 3 is a flowchart illustrating an engine control process. The engine control process illustrated in FIG. 3 controls the injection time of each of the in-cylinder injection valve 6 and the port injection valve 7 and the ignition timing of the ignition plug 8 for each cylinder 3a and is repeatedly performed in synchronization with an occurrence of the TDC signal. Referring to FIG. 3, in Step 1 (abbreviated to "S1" in FIG. 3 and the same applies to the other flowcharts), the ECU 2 divides the detected ethanol remaining amount QRF2 by the sum of the gasoline remaining amount QRF1 and the ethanol remaining amount QRF2 that are detected to calculate an ethanol remaining amount ratio RQRF2 (RQRF2=QRF2/(QRF1+QRF2)).

In Step 2, the ECU 2 corrects the detected first ethanol concentration EL1 to calculate first estimated ethanol concentration EL1E. In Step 3, the ECU 2 corrects the detected second ethanol concentration EL2 to calculate second estimated ethanol concentration EL2E. In this case, the first and second estimated ethanol concentrations EL1E and EL2E are corrected to lower values as the degree of largeness of the knock strength KNOCK with respect to a predetermined determination value KJUD is increased in Step 10 described below.

In Step 4, the ECU 2 calculates a basic fuel injection amount QINJB by searching a certain map (not illustrated) on the basis of the engine rotation speed NE and the calculated intake air amount QAIR. In Step 5, the ECU 2 calculates requested ethanol concentration EREQ by searching a certain map (not illustrated) on the basis of the engine rotation speed NE and the intake air amount QAIR. The requested ethanol concentration EREQ is a requested value of the ethanol concentration in the fuel to be supplied into the combustion chamber 3d and is set to a higher value with the increasing requested torque TREQ in the above map.

In Step 6, the ECU 2 calculates a basic port injection ratio RF2B by searching a certain map (not illustrated) on the basis of the first and second estimated ethanol concentrations EL1E and EL2E calculated in Step 2 and Step 3, respectively, and the requested ethanol concentration EREQ calculated in Step 5. The basic port injection ratio RF2B is the basic value of the ratio of a port injection amount with respect to the sum of an in-cylinder injection amount and the port injection amount and is set in the above map so that the ethanol concentration in the fuel to be supplied into the combustion chamber 3d is equal to the requested ethanol concentration EREQ.

In Step 7, the ECU 2 multiplies the basic fuel injection amount QINJB calculated in Step 4 by a correction factor KINJ to calculate a total fuel injection amount QINJT. The total fuel injection amount QINJT is a target value of the sum of the amount of injection through the in-cylinder injection valve 6 (hereinafter referred to as the "in-cylinder injection amount") and the amount of injection through the port injection valve 7 (hereinafter referred to as the "port injection amount"). The correction factor KINJ is set on the basis of a stoichiometric mixture ratio correction coefficient and a fuel-air ratio correction coefficient. The stoichiometric mixture ratio correction coefficient is based on the fact that, when the ethanol concentration in the fuel is varied, the mass ratio of the fuel at which the air fuel ratio LAF is a stoichiometric air-fuel ratio with respect to the intake air amount QAIR (hereinafter referred to as "stoichiometric mixture ratio") is varied. The stoichiometric mixture ratio correction coefficient is used to compensate the influence of the above fact and is calculated, for example, in the following manner.

First, the stoichiometric mixture ratio of the gasoline G and the ethanol E is calculated by searching a certain map (not illustrated) on the basis of the first and second estimated ethanol concentrations EL1E and EL2E. Next, the sum of the value resulting from multiplication of the value, which results from subtraction of the basic port injection ratio RF2B calculated in Step 6 from a value of 1.0, by the calculated stoichiometric mixture ratio of the gasoline G and the value resulting from multiplication of the basic port injection ratio RF2B by the calculated stoichiometric mixture ratio of the ethanol E is calculated as the stoichiometric mixture ratio correction coefficient. The total fuel injection amount QINJT is calculated on the basis of the stoichiometric mixture ratio correction coefficient and is set to a higher value with the increasing first and second estimated ethanol concentrations EL1E and EL2E. The fuel-air ratio correction coefficient is calculated in accordance with certain feedback control algorithm, for example, so that the calculated air fuel ratio LAF is equal to a predetermined target air fuel ratio. The stoichiometric mixture ratio correction coefficient may be calculated on the basis of a port injection ratio RF2 finally calculated in Step 23 or Step 27 in FIG. 4, Step 42 in FIG. 6, or Step 79 or Step 81 in FIG. 8, instead of the basic port injection ratio RF2B.

In Step 8, the ECU 2 calculates basic ignition timing IGB by searching a certain map (not illustrated) on the basis of the engine rotation speed NE and the intake air amount QAIR. In Step 9, the ECU 2 multiplies the calculated basic ignition timing IGB by a correction factor KIG to calculate a temporary ignition timing IGTEM. The correction factor KIG is calculated on the basis of, for example, the detected engine water temperature TW. The temporary ignition timing IGTEM is set to an optimal ignition timing of the ignition plug 8 when the efficiency of the engine 3 is maximized in the above manner.

In Step 10, the ECU 2 determines whether the knock strength KNOCK is greater than the predetermined determination value KJUD. The maximum value of the knock strength KNOCK detected in the previous combustion cycle of the engine 3 is used as the knock strength KNOCK in any of this process and processes described below, instead of the knock strength KNOCK detected at the corresponding process.

If the determination in Step 10 is affirmative (YES in Step 10) (KNOCK>KJUD), the ECU 2 determines that the knocking of the engine 3 occurs and, in Step 11, the ECU 2 performs a knocking control process. Then, the process illustrated in FIG. 3 is terminated. If the determination in Step 10 is negative (NO in Step 10) (KNOCK≤KJUD), the ECU 2 determines that the knocking of the engine 3 does not occur and, in Step 12, the ECU 2 performs a non-knocking control process. Then, the process illustrated in FIG. 3 is terminated.

Figure 4:
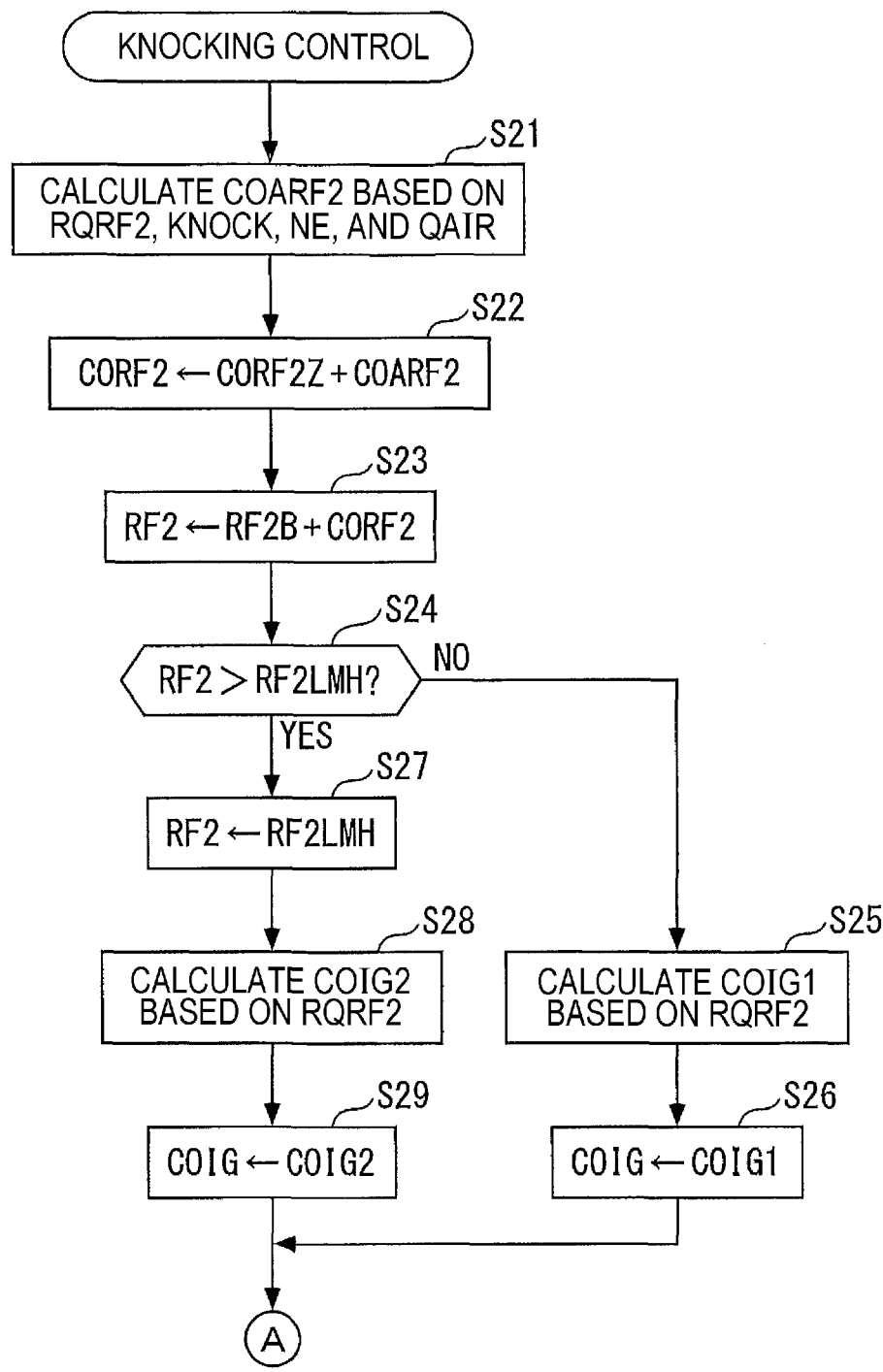
FIG. 4 is a flowchart illustrating a subroutine of a knocking control process performed in Step 11 in FIG. 3.
Figure 5:
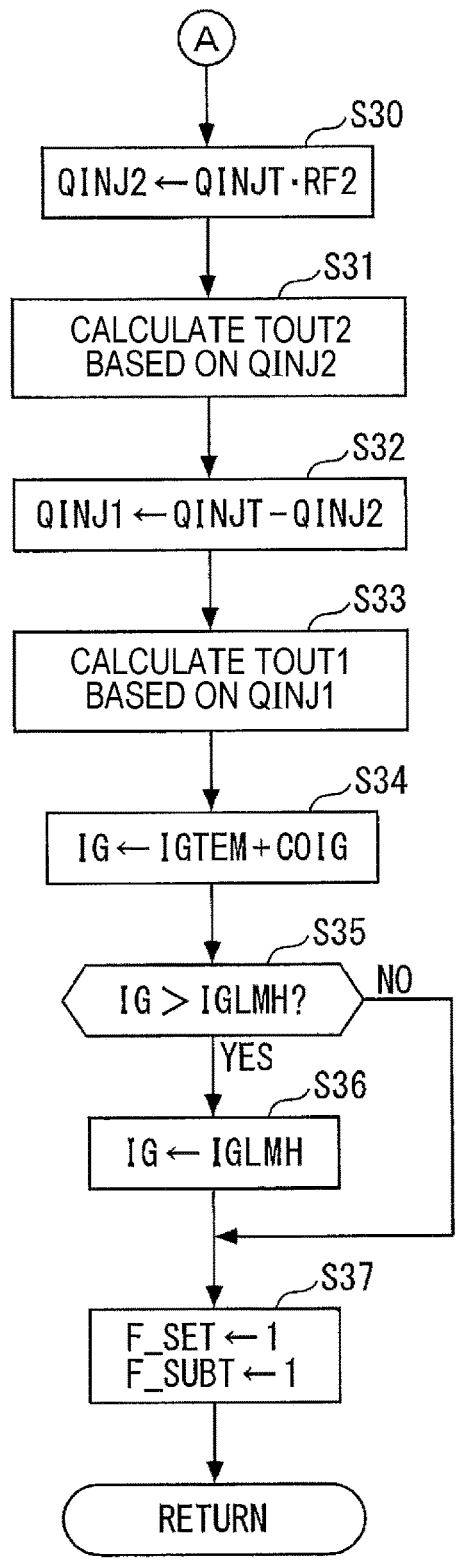
FIG. 5 is a flowchart illustrating the continued subroutine of the knocking control process in FIG. 4.

FIG. 4 and FIG. 5 are flowcharts illustrating the knocking control process performed in Step 11 in FIG. 3. Referring to FIG. 4, in Step 21, the ECU 2 calculates an addition term COARF2 by searching a certain map (not illustrated) on the basis of the ethanol remaining amount ratio RQRF2 calculated in Step 1 in FIG. 3, the knock strength KNOCK, the engine rotation speed NE, and the intake air amount QAIR. The addition term COARF2 is set to a positive value in this map and how to set the addition term COARF2 will be described in detail below.

In Step 22, the ECU 2 adds the addition term COARF2 calculated in Step 21 to a previous port injection ratio correction term value CORF2Z, which is a correction value of the basic port injection ratio RF2B described above, to calculate a current port injection ratio correction term CORF2. The previous port injection ratio correction term value CORF2Z is set to a certain upper limit value at start of the engine 3. In Step 23, the ECU 2 adds the port injection ratio correction term CORF2 calculated in Step 22 to the basic port injection ratio RF2B calculated in Step 6 in FIG. 3 to calculate the port injection ratio RF2.

In Step 24, the ECU 2 determines whether the calculated port injection ratio RF2 is higher than an upper limit value RF2LMH. The upper limit value RF2LMH is set to a positive value lower than or equal to a value of 1.0 in a process illustrated in FIG. 9 and FIG. 10 described below. If the determination in Step 24 is negative (NO in Step 24) (RF2≤RF2LMH), in Step 25, the ECU 2 calculates a first ignition timing correction term COIG1 by searching a certain map (not illustrated) on the basis of the ethanol remaining amount ratio RQRF2. The first ignition timing correction term COIG1 is set to a positive value in this map and how to set the first ignition timing correction term COIG1 will be described in detail below. In Step 26, the ECU 2 sets the calculated first ignition timing correction term COIG1 as an ignition timing correction term COIG. Then, the process goes to Step 30 in FIG. 5. The ignition timing correction term COIG is a correction term used to correct the temporary ignition timing IGTEM.

If the determination in Step 24 is affirmative (YES in Step 24) and the port injection ratio RF2 is higher than the upper limit value RF2LMH, in Step 27, the ECU 2 sets the port injection ratio RF2 to the upper limit value RF2LMH. In Step 28, the ECU 2 calculates a second ignition timing correction term COIG2 by searching a certain map (not illustrated) on the basis of the ethanol remaining amount ratio RQRF2. The second ignition timing correction term COIG2 is set to a positive value in this map and how to set the second ignition timing correction term COIG2 will be described in detail below. In Step 29, the ECU 2 sets the calculated second ignition timing correction term COIG2 as the ignition timing correction term COIG. Then, the process goes to Step 30 in FIG. 5.

Referring to FIG. 5, in Step 30, the ECU 2 multiplies the total fuel injection amount QINJT calculated in Step 7 by the port injection ratio RF2 calculated in Step 23 to calculate a target port injection amount QINJ2. In Step 31, the ECU 2 calculates a final port injection time TOUT2, which is a target value of the time when the port injection valve 7 is opened, on the basis of the calculated target port injection amount QINJ2. Upon calculation of the final port injection time TOUT2 in the above manner, the port injection valve 7 is opened at a port injection start time calculated in a process not illustrated and the time when the port injection valve 7 is opened is controlled so as to be equal to the final port injection time TOUT2. As a result, the port injection amount is controlled so as to be equal to the target port injection amount QINJ2 calculated in Step 30.

In Step 32, the ECU 2 subtracts the target port injection amount QINJ2 calculated in Step 30 from the total fuel injection amount QINJT to calculate a target in-cylinder injection amount QINJ1. In Step 33, the ECU 2 calculates a final in-cylinder injection time TOUT1, which is a target value of the time when the in-cylinder injection valve 6 is opened, on the basis of the calculated target in-cylinder injection amount QINJ1. Upon calculation of the final in-cylinder injection time TOUT1 in the above manner, the in-cylinder injection valve 6 is opened at an in-cylinder injection start time calculated in a process not illustrated and the time when the in-cylinder injection valve 6 is opened is controlled so as to be equal to the final in-cylinder injection time TOUT1. As a result, the in-cylinder injection amount is controlled so as to be equal to the target in-cylinder injection amount QINJ1 calculated in Step 32.

In Step 34, the ECU 2 adds the ignition timing correction term COIG calculated in Step 26 or Step 29 to the temporary ignition timing IGTEM calculated in Step 9 in FIG. 3 to calculate ignition timing IG. In Step 35, the ECU 2 determines whether the calculated ignition timing IG is greater than an upper limit value IGLMH. The upper limit value IGLMH is a limited value at a delay angle side of the ignition timing IG and is calculated in the process illustrated in FIG. 9 and FIG. 10. If the determination in Step 35 is affirmative (YES in Step 35) (IG>IGLMH), in Step 36, the ECU 2 sets the ignition timing IG to the upper limit value IGLMH. Then, the process goes to Step 37. If the determination in Step 35 is negative (NO in Step 35) (IG≤IGLMH), the process skips Step 36 and goes to Step 37.

In Step 37, the ECU 2 sets a setting flag F_SET and a subtraction flag F_SUBT, which are described below, to one ("1"). Then, the process illustrated in FIG. 4 and FIG. 5 is terminated. Upon calculation of the ignition timing IG in the above manner, the ignition timing of the ignition plug 8 is controlled so as to be equal to the calculated ignition timing IG. The ignition timing IG is shifted to the delay angle side with the increasing value of the ignition timing IG. The setting flag F_SET and the subtraction flag F_SUBT are reset to zero ("0") at start of the engine 3.

As described above, in the knocking control process, the port injection ratio correction term CORF2 is added to the basic port injection ratio RF2B in Steps 21 to 23 to perform increase correction of the port injection ratio RF2. In this case, the addition term COARF2 added to the previous port injection ratio correction term value CORF2Z is set to a higher value with the increasing ethanol remaining amount ratio RQRF2 and is set to a higher value with the increasing knock strength KNOCK in the map. Accordingly, the amount of increase correction of the port injection ratio RF2 is increased with the increasing ethanol remaining amount ratio RQRF2 and the increasing knock strength KNOCK. The port injection ratio correction term CORF2 is limited to a value lower than or equal to the upper limit value described above through a limiting process (not illustrated).

In the knocking control process, the ignition timing correction term COIG is added to the temporary ignition timing IGTEM in Steps 25, 26, 28, 29, and 34 to correct the ignition timing IG to the delay angle side. In this case, the first and second ignition timing correction terms COIG1 and COIG2 used as the ignition timing correction term COIG are set to higher values in the map with the decreasing ethanol remaining amount ratio RQRF2. Accordingly, an amount of delay-angle correction of the ignition timing IG is increased with the decreasing ethanol remaining amount ratio RQRF2. The first and second ignition timing correction terms COIG1 and COIG2 are set to values at which the knocking of the engine 3 is suppressed in accordance with the influence of attachment of the ethanol E on the wall of the intake port 4a and the influence of delay in time in which the fuel injected from the port injection valve 7 actually flows into the cylinder 3a (hereinafter referred to as "flow time delay of the fuel injected from the port").

The port injection ratio RF2 subjected to the increase correction is limited to a value lower than or equal to the upper limit value RF2LMH (Steps 24 and 27). In addition, the second ignition timing correction term COIG2 is used as the ignition timing correction term COIG if the port injection ratio RF2 is limited by the upper limit value RF2LMH (YES in Step 24), and the first ignition timing correction term COIG1 is used as the ignition timing correction term COIG if the port injection ratio RF2 is not limited by the upper limit value RF2LMH (NO in Step 24). In the above map, the second ignition timing correction term COIG2 is set to a value higher than the first ignition timing correction term COIG1 in consideration of the entire ethanol remaining amount ratio RQRF2. Accordingly, when the port injection ratio RF2 subjected to the increase correction is limited by the upper limit value RF2LMH, the amount of delay-angle correction of the ignition timing IG is increased, compared with the case in which the port injection ratio RF2 subjected to the increase correction is not limited by the upper limit value RF2LMH.

Figure 6:
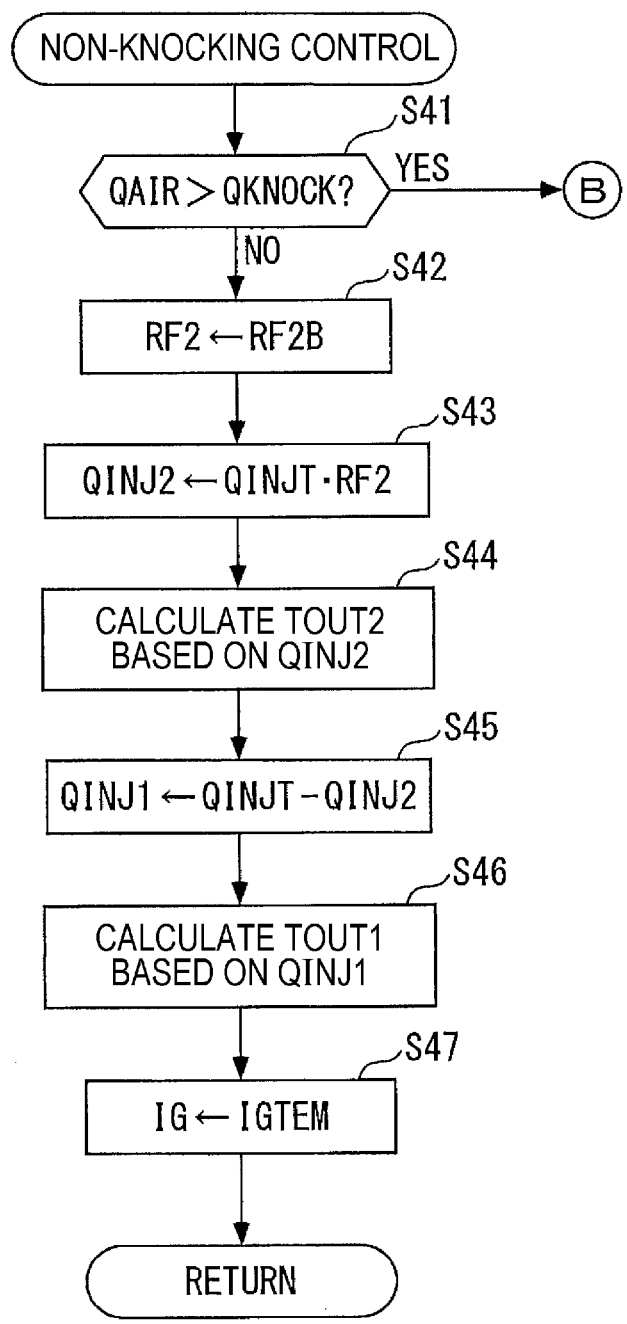
FIG. 6 is a flowchart illustrating a subroutine of a non-knocking control process performed in Step 12 in FIG. 3.
Figure 7:
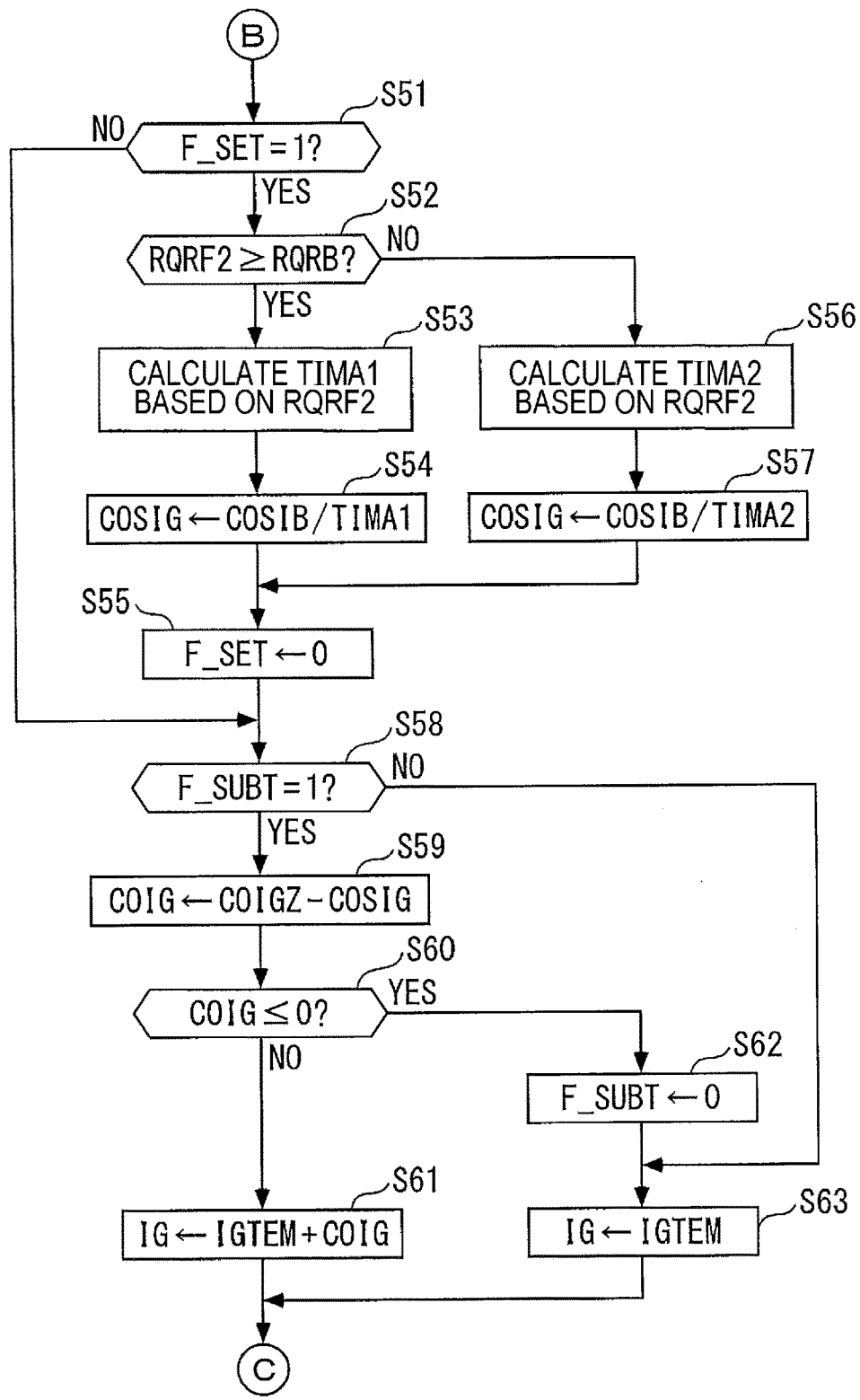
FIG. 7 is a flowchart illustrating the continued subroutine of the non-knocking control process in FIG. 6.
Figure 8:
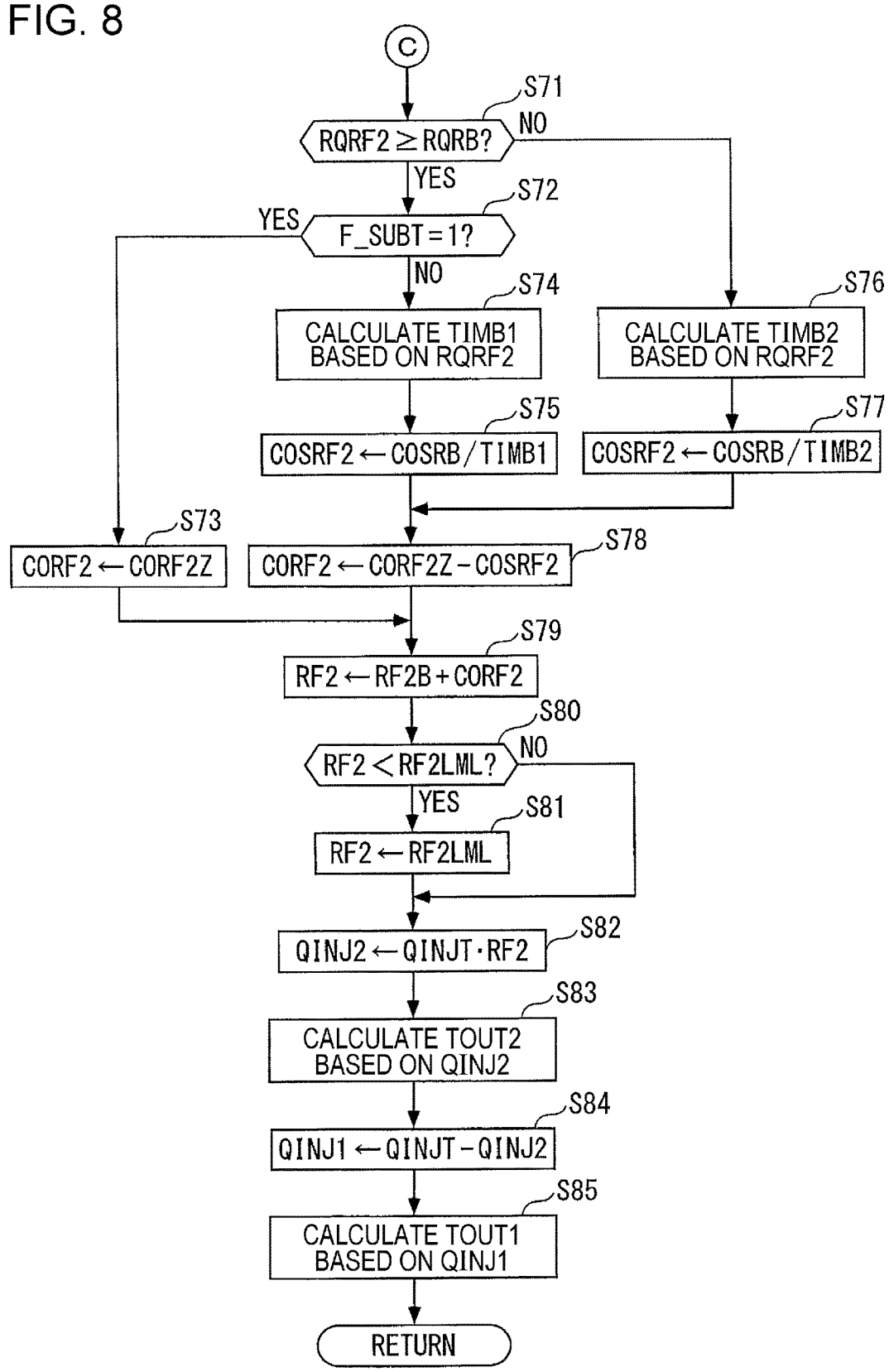
FIG. 8 is a flowchart illustrating the continued subroutine of the non-knocking control process in FIG. 7.

FIG. 6 to FIG. 8 are flowcharts illustrating the non-knocking control process performed in Step 12 in FIG. 3. Referring to FIG. 6, in Step 41, the ECU 2 determines whether the intake air amount QAIR is greater than a predetermined value QKNOCK. If the determination in Step 41 is negative (NO in Step 41) (QAIR≤QKNOCK), the ECU 2 determines that the engine 3 is not in a load area in which the knocking may occur. In Step 42, the ECU 2 directly sets the basic port injection ratio RF2B calculated in Step 6 in FIG. 3 as the port injection ratio RF2.

In Steps 43 to 46, the target port injection amount QINJ2, the final port injection time TOUT2, the target in-cylinder injection amount QINJ1, and the final in-cylinder injection time TOUT1 are calculated in the same manners as in Steps 30 to 33 in FIG. 5. Through the above steps, the port injection amount is controlled so as to be equal to the target port injection amount QINJ2 calculated in Step 43 and the in-cylinder injection amount is controlled so as to be equal to the target in-cylinder injection amount QINJ1 calculated in Step 45.

In Step 47, the ECU 2 sets the ignition timing IG to the temporary ignition timing IGTEM calculated in Step 9 in FIG. 3. Then, the process illustrated in FIG. 6 is terminated. Upon calculation of the ignition timing IG in the above manner, the ignition timing of the ignition plug 8 is controlled so as to be equal to the ignition timing IG calculated in Step 47, as in Step 34.

If the determination in Step 41 is affirmative (YES in Step 41), the ECU 2 determines that the engine 3 is in the load area in which the knocking may occur. In Step 51 in FIG. 7, the ECU 2 determines whether the setting flag F_SET is set to one ("1"). If the determination in Step 51 is affirmative (YES in Step 51) (F_SET=1), in Step 52, the ECU 2 determines whether the ethanol remaining amount ratio RQRF2 is higher than or equal to a predetermined value RQRB.

If the determination in Step 52 is affirmative (YES in Step 52) (RQRF2≥RQRB), in Step 53, the ECU 2 calculates a first subtraction time TIMA1 by searching a certain map (not illustrated) on the basis of the ethanol remaining amount ratio RQRF2. The first subtraction time TIMA1 is set to a positive value in this map and how to set the first subtraction time TIMA1 will be described in detail below. In Step 54, the ECU 2 divides a predetermined basic subtraction term COSIB by the calculated first subtraction time TIMA1 to calculate a subtraction term COSIG. In Step 55, the ECU 2 resets the setting flag F_SET to zero ("0") in order to terminate the calculation and setting of the subtraction term COSIG. Then, the process goes to Step 58.

If the determination in Step 52 is negative (NO in Step 52) and the ethanol remaining amount ratio RQRF2 is lower than the predetermined value RQRB, in Step 56, the ECU 2 calculates a second subtraction time TIMA2 by searching a certain map (not illustrated) on the basis of the ethanol remaining amount ratio RQRF2. The second subtraction time TIMA2 is set to a positive value in this map and how to set the second subtraction time TIMA2 will be described in detail below. In Step 57, the ECU 2 divides the basic subtraction term COSIB by the calculated second subtraction time TIMA2 to calculate the subtraction term COSIG. In Step 55, the ECU 2 resets the setting flag F_SET to zero ("0") in order to terminate the calculation and setting of the subtraction term COSIG. Then, the process goes to Step 58.

If the determination in Step 51 is negative (NO in Step 51), the process skips Steps 52 to 57 and goes to Step 58.

In Step 58, the ECU 2 determines whether the subtraction flag F_SUBT is set to one ("1"). If the determination in Step 58 is affirmative (YES in Step 58) (F_SUBST=1), in Step 59, the ECU 2 subtracts the subtraction term COSIG calculated in Step 54 or Step 57 from a previous ignition timing correction term value COIGZ calculated in Step 26 or Step 29 to calculate the current ignition timing correction term COIG.

In Step 60, the ECU 2 determines whether the ignition timing correction term COIG calculated in Step 59 is smaller than or equal to zero. If the determination in Step 60 is negative (NO in Step 60) (COIG>0), in Step 61, the ECU 2 adds the ignition timing correction term COIG calculated in Step 59 to the temporary ignition timing IGTEM calculated in Step 9 in FIG. 3 to calculate the ignition timing IG. Then, the process goes to Step 71 in FIG. 8. Upon calculation of the ignition timing IG in the above manner, the ignition timing of the ignition plug 8 is controlled so as to be equal to the ignition timing IG calculated in Step 61, as in Step 34 in FIG. 5.

If the determination in Step 60 is affirmative (YES in Step 60) and the ignition timing correction term COIG is smaller than or equal to zero, in Step 62, the ECU 2 resets the subtraction flag F_SUBT to zero ("0") in order to terminate the subtraction step to calculate the ignition timing correction term COIG in Step 59. In Step 63, the ECU 2 sets the ignition timing IG to the temporary ignition timing IGTEM calculated in Step 9 in FIG. 3. Then, the process goes to Step 71 in FIG. 8.

If the determination in Step 58 is negative (NO in Step 58) (F_SUBT=0), in Step 63, the ECU 2 sets the ignition timing IG to the temporary ignition timing IGTEM. Then, the process goes to Step 71 in FIG. 8.

Referring to FIG. 8, in Step 71, the ECU 2 determines whether the ethanol remaining amount ratio RQRF2 is higher than or equal to the predetermined value RQRB. If the determination in Step 71 is affirmative (YES in Step 71) (RWRF2≥RQRB), in Step 72, the ECU 2 determines whether the subtraction flag F_SUBT is set to one ("1"). If the determination in Step 72 is affirmative (YES in Step 72) (F_SUBT=1), that is, if the subtraction step to calculate the ignition timing correction term COIG in Step 59 is being performed, in Step 73, the ECU 2 sets the previous port injection ratio correction term value CORF2Z as the current port injection ratio correction term CORF2. Then, the process goes to Step 79.

If the determination in Step 72 is negative (NO in Step 72)(F_SUBT=0 and the subtraction step to calculate the ignition timing correction term COIG is not being performed, in Step 74, the ECU 2 calculates a first subtraction time TIMB1 by searching a certain map (not illustrated) on the basis of the ethanol remaining amount ratio RQRF2. The first subtraction time TIMB1 is set to a positive value in this map and how to set the first subtraction time TIMB1 will be described in detail below. In Step 75, the ECU 2 divides a predetermined basic subtraction term COSRB by the calculated first subtraction time TIMB1 to calculate a subtraction term COSRF2. Then, the process goes to Step 78.

If the determination in Step 71 is negative (NO in Step 71) (RQRF2<RQRB), in Step 76, the ECU 2 calculates a second subtraction time TIMB2 by searching a certain map (not illustrated) on the basis of the ethanol remaining amount ratio RQRF2. The second subtraction time TIMB2 is set to a positive value in this map and how to set the second subtraction time TIMB2 will be described in detail below. In Step 77, the ECU 2 divides the basic subtraction term COSRB by the calculated second subtraction time TIMB2 to calculate the subtraction term COSRF2. Then, the process goes to Step 78.

In Step 78, the ECU 2 subtracts the subtraction term COSRF2 calculated in Step 75 or Step 77 from the previous port injection ratio correction term value CORF2Z to calculate the current port injection ratio correction term CORF2. Then, the process goes to Step 79.

In Step 79, the ECU 2 adds the port injection ratio correction term CORF2 set and calculated in Step 73 or Step 78 to the basic port injection ratio RF2B calculated in Step 6 in FIG. 3 to calculate the port injection ratio RF2. In Step 80, the ECU 2 determines whether the calculated port injection ratio RF2 is lower than a predetermined lower limit value RF2LML. The lower limit value RF2LML is set to a positive value lower than the upper limit value RF2LMH used in Step 24 in FIG. 4.

If the determination in Step 80 is affirmative (YES in Step 80) (RF2<RF2LML), in Step 81, the ECU 2 sets the port injection ratio RF2 to the lower limit value RF2LML. Then, the process goes to Step 82. If the determination in Step 80 is negative (NO in Step 80) and the port injection ratio RF2 is higher than or equal to the lower limit value RF2LML (RF2≥RF2LML), the process skips Step 81 and goes to Step 82.

In Steps 82 to 85, the target port injection amount QINJ2, the final port injection time TOUT2, the target in-cylinder injection amount QINJ1, and the final in-cylinder injection time TOUT1 are calculated in the same manners as in Steps 30 to 33 in FIG. 5. Then, the process illustrated in FIG. 6 to FIG. 8 is terminated. Through the above steps, the port injection amount is controlled so as to be equal to the target port injection amount QINJ2 calculated in Step 82 and the in-cylinder injection amount is controlled so as to be equal to the target in-cylinder injection amount QINJ1 calculated in Step 84.

As described above, in the non-knocking control process, if the engine 3 is not in the load area in which the knocking may occur (NO in Step 41 in FIG. 6), the port injection ratio RF2 is set to the basic port injection ratio RF2B (Step 42) and the ignition timing IG is set to the temporary ignition timing IGTEM (Step 47). If the engine 3 is in the load area in which the knocking may occur (YES in Step 41), the subtraction flag F_SUBT is kept at zero ("0") unless the knocking occurs at start of the engine 3 and the ignition timing IG is set to the temporary ignition timing IGTEM (NO in Step 58 and Step 63 in FIG. 7).

If the engine 3 is in the load area in which the knocking may occur and the knocking control process has been performed because it has been determined that the knocking of the engine 3 has occurred, the subtraction step to calculate the ignition timing correction term COIG set in the knocking control process is performed (Step 59 in FIG. 7).

The subtraction step to calculate the ignition timing correction term COIG is repeated until the ignition timing correction term COIG has a value smaller than or equal to zero and the ignition timing IG is set to a value resulting from addition of the ignition timing correction term COIG to the temporary ignition timing IGTEM during the subtraction step (Step 61 in FIG. 7). If the ignition timing correction term COIG has a value smaller than or equal to zero (YES in Step 60), the subtraction step to calculate the ignition timing correction term COIG is terminated and the subtraction flag F_SUBT is set to zero ("0") (Step 62). After the subtraction step to calculate the ignition timing correction term COIG is terminated, the ignition timing IG is set to temporary ignition timing IGTEM (NO in Step 58 and Step 63). As described above, the ignition timing IG is corrected to the delay angle side, compared with the temporary ignition timing IGTEM, when the knocking of the engine 3 has occurred and is gradually returned to the temporary ignition timing IGTEM at an advance angle side when no knocking occurs.

The subtraction term COSIG subtracted from the previous ignition timing correction term value COIGZ is calculated by dividing the predetermined basic subtraction term COSIB by the first or second subtraction time TIMA1 or TIMA2 (Step 54 or Step 57 in FIG. 7). The first and second subtraction times TIMA1 and TIMA2 are set to higher values with the decreasing the ethanol remaining amount ratio RQRF2 in the map (Steps 53 and 56). The first subtraction time TIMA1 is used if the ethanol remaining amount ratio RQRF2 is higher than or equal to the predetermined value RQRB (YES in Step 52) and the second subtraction time TIMA2 is used if the ethanol remaining amount ratio RQRF2 is lower than the predetermined value RQRB (NO in Step 52). The second subtraction time TIMA2 is set to a value higher than the first subtraction time TIMA1 in the map in consideration of the ethanol remaining amount ratio RQRF2. As described above, since the subtraction term COSIG is set to a lower value with the decreasing ethanol remaining amount ratio RQRF2, the time before the ignition timing IG is returned to the temporary ignition timing IGTEM is lengthened.

The first subtraction time TIMA1 is set in accordance with the flow time delay of the fuel injected from the port (the delay in time in which the fuel injected from the port injection valve 7 actually flows into the cylinder 3*a*) in the map and the first subtraction time TIMA1 is set to a value at which the ignition timing correction term COIG does not have a value of zero during the flow time delay of the fuel injected from the port.

In addition, in the non-knocking control process, when the engine 3 is in the load area in which the knocking may occur, the subtraction step to calculate the port injection ratio correction term CORF2 in which the subtraction term COSRF2 is subtracted from the previous port injection ratio correction term value CORF2Z is performed (Step 78 in FIG. 8). The subtraction step to calculate the port injection ratio correction term CORF2 is basically different from the subtraction step to calculate the ignition timing correction term COIG described above and is repeated as long as the knocking of the engine 3 does not occur and the engine 3 is in the load area in which the knocking may occur.

If the ethanol remaining amount ratio RQRF2 is higher than or equal to the predetermined value RQRB when the knocking of the engine 3 does not occur (YES in Step 71), the subtraction step to calculate the port injection ratio correction term CORF2 is not performed before the subtraction step to calculate the ignition timing correction term COIG is terminated since the non-knocking control process is started and the port injection ratio correction term CORF2 is kept at the previous port injection ratio correction term value CORF2Z (YES in Step 72 and Step 73). Accordingly, the port injection ratio correction term CORF2 is kept at a value that is increased in the knocking control process (Step 22 in FIG. 4) before the ignition timing correction term COIG has a value of zero since the non-knocking control process is started. If the subtraction step to calculate the ignition timing correction term COIG is terminated (NO in Step 72), the subtraction step to calculate the port injection ratio correction term CORF2 is started.

If the ethanol remaining amount ratio RQRF2 is lower than the predetermined value RQRB (NO in Step 71), the subtraction step to calculate the port injection ratio correction term CORF2 is started in response to start of the non-knocking control process, regardless of the subtraction step to calculate the ignition timing correction term COIG. In other words, in this case, the subtraction step to calculate the ignition timing correction term COIG and the subtraction step to calculate the port injection ratio correction term CORF2 are concurrently performed.

The subtraction term COSRF2 subtracted from the previous port injection ratio correction term value CORF2Z is calculated by dividing the basic subtraction term COSRB by the first or second subtraction time TIMB1 or TIMB2 (in Step 75 or Step 77 in FIG. 8). The first and second subtraction times TIMB1 and TIMB2 are set to lower values with the decreasing the ethanol remaining amount ratio RQRF2 in the map (Steps 74 and 76). The first subtraction time TIMB1 is used if the ethanol remaining amount ratio RQRF2 is higher than or equal to the predetermined value RQRB (YES in Step 71) and the second subtraction time TIMB2 is used if the ethanol remaining amount ratio RQRF2 is lower than the predetermined value RQRB (NO in Step 71). The second subtraction time TIMB2 is set to a value lower than the first subtraction time TIMB1 in the map in consideration of the ethanol remaining amount ratio RQRF2. As described above, the subtraction term COSRF2 is set to a higher value with the decreasing ethanol remaining amount ratio RQRF2. Accordingly, the port injection ratio correction term CORF2 is decreased with a greater slope and, thus, the port injection ratio RF2 to which the port injection ratio correction term CORF2 is added is also decreased with a greater slope.

The port injection ratio correction term CORF2 is limited to a value higher than or equal to a predetermined lower limit value through the limiting process (not illustrated).

As described above, in the engine control process, the port injection ratio RF2 is basically subjected to decrease correction if the knocking of the engine 3 does not occur and is subjected to the increase correction if the knocking of the engine 3 occurs for the following reasons. Since the precisions of the first and second ethanol concentrations EL1 and EL2 detected by the first and second concentration sensors 39 and 40, respectively, are not necessarily high because the precisions of the first and second ethanol concentrations EL1 and EL2 are affected by individual difference between the first and second concentration sensors 39 and 40 and aging deterioration. Accordingly, even when the port injection ratio RF2 is calculated using the first and second estimated ethanol concentrations EL1E and EL2E calculated on the basis of the first and second ethanol concentrations EL1 and EL2, respectively, and the requested ethanol concentration EREQ, the actual ethanol concentration in the fuel to be supplied into the combustion chamber 3d is made higher or lower than the requested ethanol concentration EREQ. The former case leads wasteful consumption of the ethanol E and the latter case leads frequent occurrence of the knocking of the engine 3. The decrease correction of the port injection ratio RF2 if the knocking of the engine 3 does not occur and the increase correction of the port injection ratio RF2 if the knocking of the engine 3 occurs are performed in order to suppress the knocking of the engine 3 while minimizing the consumption of the ethanol E in consideration of the above issues.

Figure 9:
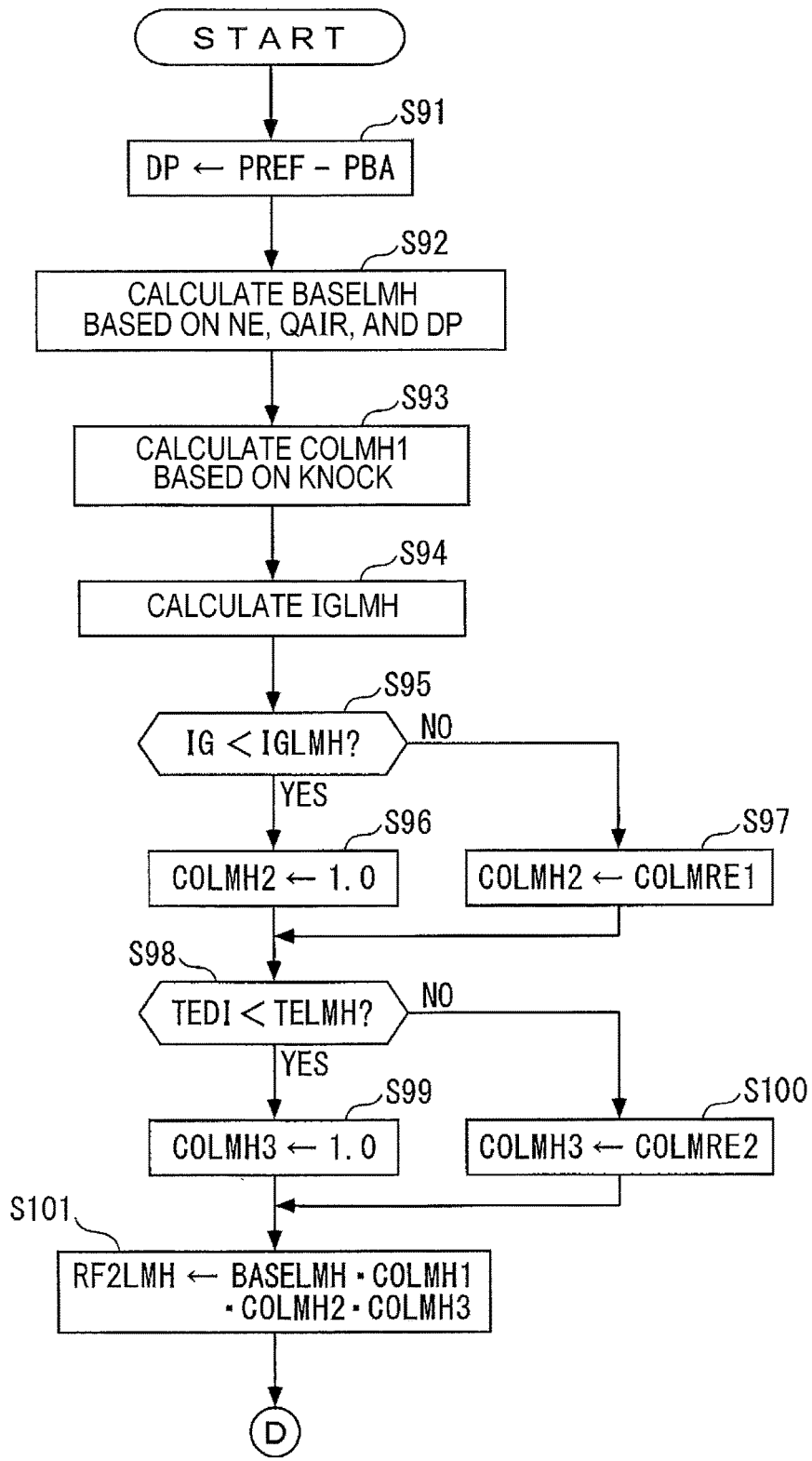
FIG. 9 is a flowchart illustrating a process to control an intake air amount of an engine.
Figure 10:
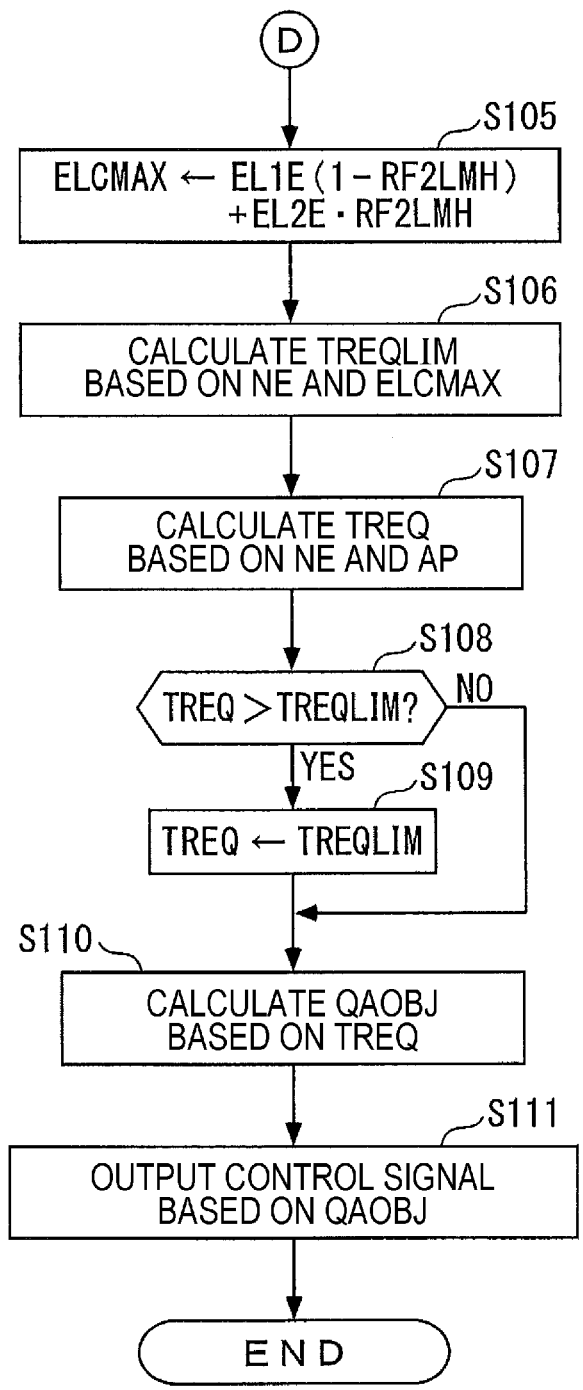
FIG. 10 is a flowchart illustrating the continued process in FIG. 9.

FIG. 9 and FIG. 10 are flowcharts illustrating a process to control the intake air amount of the engine 3. This process is repeated in synchronization with an occurrence of the TDC signal and concurrently with the engine control process described above. Referring to FIG. 9, in Step 91, the intake air pressure PBA is subtracted from the predetermined pressure PREF, which is the discharge pressure of the fuel with the low-pressure pump 22a, to calculate pressure deviation DP. In Step 92, a map illustrated in FIG. 11 is searched on the basis of the engine rotation speed NE, the intake air amount QAIR, and the pressure deviation DP calculated in Step 91 to calculate a basic value BASELMH of the upper limit value RF2LMH of the port injection ratio RF2.

Four maps that are used when the pressure deviation DP has a first predetermined value DPREFa, a second predetermined value DPREFb, a third predetermined value DPREFc, and a fourth predetermined value DPREFd are set as the maps used to calculate the basic value BASELMH. FIG. 11 illustrates the map that is used when the pressure deviation DP has the first predetermined value DPREFa. The relationship in magnitude between the first predetermined value DPREFa to the fourth predetermined value DPREFd is DPREFa>DPREFb>DPREFc>DPREFd.

Figure 11:
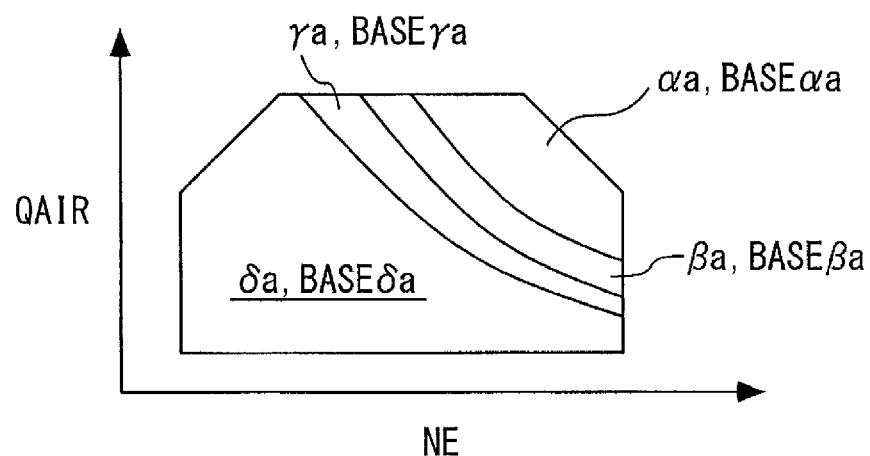
FIG. 11 is an exemplary map used to calculate a basic value used in the process in FIG. 9.

As illustrated in FIG. 11, multiple areas αa, βa, γa, and 8a defined by the engine rotation speed NE and the intake air amount QAIR are set in the map used to calculate the basic value BASELMH. When the engine rotation speed NE and the intake air amount QAIR are in the areas αa, βa, γa, and δa, the basic value BASELMH is set to a first predetermined basic value BASEαa, a second predetermined basic value BASEβa, a third predetermined basic value BASEγa, and a fourth predetermined basic value BASEδa, respectively. The map illustrated in FIG. 11 is used when the pressure deviation DP has the first predetermined value DPREFa. In a map used when the pressure deviation DP has the first predetermined value DPREFb, areas αb, βb, γb, and δb are set, although not illustrated. When the engine rotation speed NE and the intake air amount QAIR are in the areas αb, βb, γb, and δb, the basic value BASELMH is set to a first predetermined basic value BASEαb, a second predetermined basic value BASEβb, a third predetermined basic value BASEγb, and a fourth predetermined basic value BASEδb, respectively. The first to fourth basic values BASEαb to BASEδb are lower than the first to fourth basic value BASEαa to BASEδa, respectively.

In addition, in a map used when the pressure deviation DP has the first predetermined value DPREFc, areas αc, βc, γc, and δc are set. When the engine rotation speed NE and the intake air amount QAIR are in the areas αc, βc, γc, and δc, the basic value BASELMH is set to a first predetermined basic value BASEαc, a second predetermined basic value BASEβc, a third predetermined basic value BASEγc, and a fourth predetermined basic value BASEδc, respectively. The first to fourth basic values BASEαc to BASEδc are lower than the first to fourth basic value BASEαb to BASEδb, respectively. Furthermore, in a map used when the pressure deviation DP has the first predetermined value DPREFd, areas αd, βd, γd, and δd are set. When the engine rotation speed NE and the intake air amount QAIR are in the areas αd, βd, γd, and δd, the basic value BASELMH is set to a first predetermined basic value BASEαd, a second predetermined basic value BASEβd, a third predetermined basic value BASEγd, and a fourth predetermined basic value BASEδd, respectively. The first to fourth basic values BASEαd to BASEδd are lower than the first to fourth basic value BASEαc to BASEδc, respectively.

As described above, the basic value BASELMH is set to a lower value with the decreasing pressure deviation DP. This is because the port injection amount that is injected during the same time when the port injection valve 7 is opened is decreased with the decreasing pressure deviation DP, that is, as the injection pressure of the ethanol E with the port injection valve 7 is decreased with respect to the pressure at the intake port 4a. When the pressure deviation DP has a value different from the first to fourth predetermined valued DPREFa to DPREFd, the basic value BASELMH is calculated through interpolation.

In the above four maps, the areas αa to αd are set in an extremely high output area in which the output from the engine 3 (hereinafter referred to as an "engine output") represented by the engine rotation speed NE and the intake air amount QAIR is extremely high. The areas βa to βd are set in a high output area in which the engine output is relatively high and is lower than that in the areas αa to αd. The areas γa to γd are set in a medium output area in which the engine output is medium and is lower than that in the areas βa to βd. The areas δa to δd are set in a low to medium output area in which the engine output is low to medium and is lower than that in the areas γa to γd. The relationship in magnitude between the first to fourth basic value BASEαa to BASEδa is set to BASEαa<BASEβa<BASEγa<BASEδa, the relationship in magnitude between the first to fourth basic value BASEαb to BASEδb is set to BASEαb<BASEβb<BASEγb<BASEδb, the relationship in magnitude between the first to fourth basic value BASEαc to BASEδc is set to BASEαc<BASEβc<BASEγc<BASEδc, and the relationship in magnitude between the first to fourth basic value BASEαd to BASEδd is set to BASEαd<BASEβd<BASEγd<BASEδd. Accordingly, the basic value BASELMH is set to a lower value with the increasing engine output. The reason for this is as follows:

Specifically, the time per combustion cycle of the engine 3 is shortened with the increasing engine output and the increasing engine rotation speed NE. As a result, the time when the port injection valve 7 is opened, in which the ethanol injected from the port injection valve 7 is capable of being burnt in the combustion chamber 3d, is shortened and the amount of fuel capable of practically being injected from the port injection valve 7 is further decreased. In addition, as apparent from the method of calculating the target in-cylinder injection amount QINJ1, the in-cylinder injection amount of the in-cylinder injection valve 6 is decreased with the increasing port injection ratio RF2. Accordingly, it is difficult to cool the injection hole portion of the in-cylinder injection valve 6 with the gasoline G and the tip temperature TEDI is increased. As a result, precursors of deposits are flocculated in the injection hole portion of the in-cylinder injection valve 6 and the deposits are easy to accumulate. Such tendency becomes more prominent with the increasing engine output and the increasing intake air amount QAIR because the temperature in the combustion chamber 3d is increased with the increasing engine output and the increasing intake air amount QAIR. The port injection ratio RF2 of the port injection valve 7 is limited to a lower value with the increasing engine output in order to prevent the accumulation of the deposits, thus increasing the in-cylinder injection amount of the in-cylinder injection valve 6.

The maximum fourth basic value BASEδa is set to a value smaller than a value of 1.0 in order to save the ethanol E. In the setting of the basic value BASELMH, another appropriate parameter correlated with the tip temperature TEDI, for example, the engine water temperature TW may be used, instead of the intake air amount QAIR.

Referring back to FIG. 9, in Step 93, a first correction factor COLMH1 is calculated by searching a certain map (not illustrated) on the basis of the knock strength KNOCK. The first correction factor COLMH1 is used as a correction factor to correct the basic value BASELMH in order to calculate the upper limit value RF2LMH. In the above map, the first correction factor COLMH1 is set to a higher value higher than or equal to a value of 1.0 with the increasing knock strength KNOCK. This is because the limitation of the port injection ratio RF2 is reduced as the knock strength KNOCK is increased in order to appropriately suppress the knocking of the engine 3.

In Step 94, the upper limit value IGLMH (the limited value at the delay angle side) of the ignition timing IG is calculated by searching a certain map (not illustrated) on the basis of the engine rotation speed NE and the intake air amount QAIR. The upper limit value IGLMH is set to a value that prevents overheat of exhaust gas from the engine 3 and destabilization of the combustion due to the shift of the ignition timing IG to the delay angle side in the map and is set to a value higher than the temporary ignition timing IGTEM (a value at the delay angle side) with the same engine rotation speed NE and the same intake air amount QAIR.

In Step 95, it is determined whether the ignition timing IG calculated in FIG. 5 or FIG. 7 is lower than the upper limit value IGLMH calculated in Step 94. If the determination in Step 95 is affirmative (YES in Step 95) (IG<IGLMH), that is, if the ignition timing IG is not limited by the upper limit value IGLMH in Step 35 and Step 36 in FIG. 5, in Step 96, a second correction factor COLMH2 is set to a value of 1.0. Then, the process goes to Step 98. The second correction factor COLMH2 is used as a correction factor to correct the basic value BASELMH in order to calculate the upper limit value RF2LMH, like the first correction factor COLMH1.

If the determination in Step 95 is negative (NO in Step 95) (IG≥IGLMH), that is, if the ignition timing IG is limited by the upper limit value IGLMH in Step 35 and Step 36, in Step 97, the second correction factor COLMH2 is set to a first predetermined value COLMRE1 higher than a value of 1.0. Then, the process goes to Step 98. As described above, the correction of the basic value BASELMH using the second correction factor COLMH2 is performed only when the ignition timing IG is limited by the upper limit value IGLMH and the basic value BASELMH is increased through this correction.

In Step 98, it is determined whether the tip temperature TEDI is lower than a predetermined upper limit temperature TELMH. The upper limit temperature TELMH is set to a value slightly lower than the temperature at which the deposits are accumulated in the injection hole portion of the in-cylinder injection valve 6 and the injection hole portion of the in-cylinder injection valve 6 is overheated. If the determination in Step 98 is affirmative (YES in STEP 98) (TEDI<TELMH), In Step 99, a third correction factor COLMH3 is set to a value of 1.0. Then, the process goes to Step 101. The third correction factor COLMH3 is used as a correction factor to correct the basic value BASELMH in order to calculate the upper limit value RF2LMH, like the first correction factor COLMH1.

If the determination in STEP 98 is negative (NO in Step 98) (TEDI≥TELMH), in Step 100, the third correction factor COLMH3 is set to a second predetermined value COLMRE2 lower than a value of 1.0. Then, the process goes to Step 101. The correction of the basic value BASELMH using the third correction factor COLMH3 is performed only when the tip temperature TEDI is higher than or equal to the upper limit temperature TELMH and the basic value BASELMH is decreased through this correction.

In Step 101, the basic value BASELMH calculated in Step 92 is multiplied by the first correction factor COLMH1 calculated in Step 93, the second correction factor COLMH2 calculated in Step 96 or Step 97, and the third correction factor COLMH3 calculated in Step 99 or Step 100 to calculate the upper limit value RF2LMH. The upper limit value RF2LMH is set to a value lower than or equal to a value of 1.0 through the calculation.

In Step 105 in FIG. 10, an in-cylinder supply maximum octane number ELCMAX is calculated according to Equation (1) using the first and second estimated ethanol concentrations EL1E and EL2E calculated in Steps 2 and 3 in FIG. 3 and the upper limit value RF2LMH calculated in Step 101. Equation (1) indicates that the in-cylinder supply maximum octane number ELCMAX is the maximum value of the ethanol concentration in the fuel capable of being supplied into the combustion chamber 3d and corresponds to the maximum value of the octane number of the fuel capable of being supplied into the combustion chamber 3d. The in-cylinder supply maximum octane number ELCMAX may be calculated by searching a certain map on the basis of the first and second estimated ethanol concentrations EL1E and EL2E and the upper limit value RF2LMH.

$$ELCMAX \leftarrow EL1E(1-RF2LMH)+EL2E \cdot RF2LMH \quad (1)$$

Figure 12:
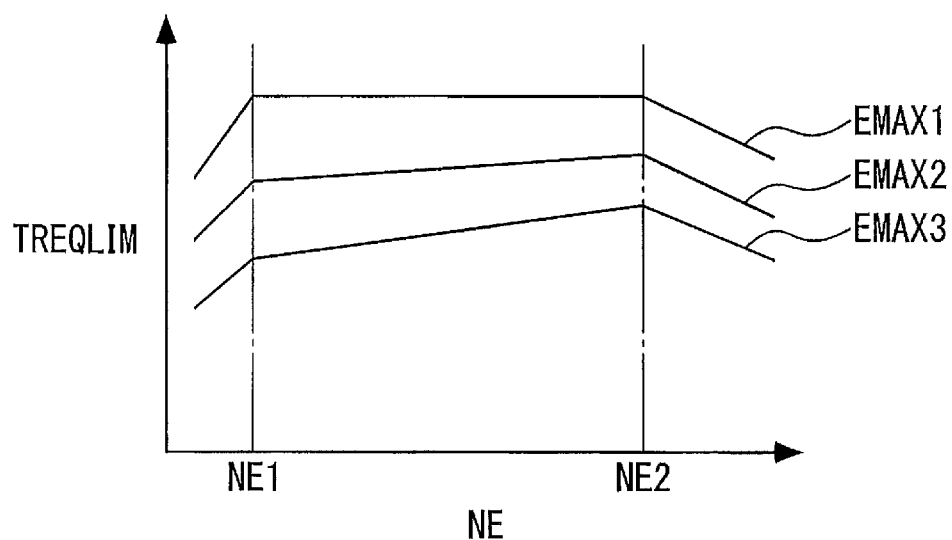
FIG. 12 is an exemplary map used to calculate upper limit requested torque used in the process in FIG. 10.

In Step 106, an upper limit requested torque TREQLIM is calculated by searching a map illustrated in FIG. 12 on the basis of the engine rotation speed NE and the calculated in-cylinder supply maximum octane number ELCMAX. The upper limit requested torque TREQLIM is the upper limit value of the requested torque TREQ of the engine 3 described below. Three maps to calculate the upper limit requested torque TREQLIM when the in-cylinder supply maximum octane number ELCMAX is a first predetermined maximum octane number EMAX1, a second predetermined maximum octane number EMAX2, and a third predetermined maximum octane number EMAX3 are set as the above map. The relationship in magnitude between the first to third maximum octane numbers EMAX1 to EMAX3 is EMAX1>EMAX2>EMAX3. When the in-cylinder supply maximum octane number ELCMAX has a value different from the first to third maximum octane numbers EMAX1 to EMAX3, the upper limit requested torque TREQLIM is calculated thorough the interpolation.

As illustrated in FIG. 12, the upper limit requested torque TREQLIM is set to a lower value with the decreasing in-cylinder supply maximum octane number ELCMAX in the maps. Accordingly, the requested torque TREQ is limited to a lower value with the decreasing in-cylinder supply maximum octane number ELCMAX. In addition, the upper limit requested torque TREQLIM is set to a maximum torque value at which the knocking of the engine 3 is reliably suppressed when the port injection ratio RF2 is set to the upper limit value RF2LMH, that is, when the concentration of the ethanol component of the fuel to be supplied into the combustion chamber 3d is adjusted to the in-cylinder supply maximum octane number ELCMAX.

Furthermore, the upper limit requested torque TREQLIM is set to a higher value with a relatively great slope with the increasing engine rotation speed NE in an extremely low rotation area in which the engine rotation speed NE is lower than a first predetermined rotation speed NE1, is set to a higher value with a relatively small slope with the increasing engine rotation speed NE in a low to high rotation area in which the engine rotation speed NE is higher than or equal to the first rotation speed NE1 and is lower than a second predetermined rotation speed NE2 (>NE1), and is set to a lower value with a relatively great slope with the increasing engine rotation speed NE in a high rotation area in which the engine rotation speed NE is higher than or equal to the second rotation speed NE2. The setting of the upper limit requested torque TREQLIM in the above manner is based on the relationship between the engine rotation speed NE and the output torque of the engine 3, which is the same as the relationship between the rotation speed and the output torque of a common internal combustion engine.

Referring back to FIG. 10, in Step 107, the requested torque TREQ is calculated by searching a certain map (not illustrated) on the basis of the engine rotation speed NE and the detected accelerator position AP. The requested torque TREQ is set to a higher value with the increasing accelerator position AP in the map.

In Step 108, it is determined whether the calculated requested torque TREQ is higher than the upper limit requested torque TREQLIM calculated in Step 106. If the determination is affirmative (YES in Step 108) (TREQ>TREQLIM), in Step 109, the requested torque TREQ is set to the upper limit requested torque TREQLIM. Then, the process goes to Step 110. If the determination is negative (NO in Step 108) (TERQ≤TREQLIM), the process skips Step 109 and goes to Step 110.

In Step 110, a target intake air amount QAOBJ is calculated by searching a certain map (not illustrated) on the basis of the requested torque TREQ set in Step 107 or Step 109. The target intake air amount QAOBJ is set to a higher value with the increasing requested torque TREQ in this map. In Step 111, a control signal based on the calculated target intake air amount QAOBJ is supplied to the TH actuator 9b. Then, the process illustrated in FIG. 10 is terminated. Control of the degree of opening of the throttle valve 9 through Step 111 controls the intake air amount QAIR so as to be equal to the target intake air amount QAOBJ and controls the torque of the engine 3 so as to be equal to the requested torque TREQ.

Various components in the present embodiment are correlated with various components in the present disclosure in the following manner. Specifically, the in-cylinder injection valve 6 in the present embodiment corresponds to a first injection valve in the present disclosure, the port injection valve 7 in the present embodiment corresponds to a second injection valve and a high octane number fuel injection valve in the present disclosure, and the knock sensor 32, the intake pressure sensor 34, and the tip temperature sensor 36 in the present embodiment correspond to a setting parameter acquiring unit in the present disclosure. The first and second concentration sensors 39 and 40 in the present embodiment correspond to first and second octane number acquiring units, respectively, in the present disclosure. The ECU 2 in the present embodiment corresponds to a maximum octane number calculating unit, an output limiting unit, the setting parameter acquiring unit, an upper limit value setting unit, and the first and second octane number acquiring units in the present disclosure.

As described above, according to the present embodiment, the in-cylinder supply maximum octane number ELCMAX corresponding to the maximum value of the octane number of the fuel capable of being supplied into the cylinder 3a is calculated (Step 105 in FIG. 10), and the output from the engine 3 is limited to a lower value with the decreasing in-cylinder supply maximum octane number ELCMAX on the basis of the calculated in-cylinder supply maximum octane number ELCMAX (Steps 106 to 111). Accordingly, unlike the control apparatus in the related art described above, it is possible to avoid an occurrence of a situation in which the octane number is not capable of being adjusted to a magnitude at which the knocking is capable of being suppressed and it is possible to appropriately suppress the knocking of the engine 3.

In this case, when the port injection ratio RF2 is set to the upper limit value RF2LMH, that is, when the concentration (the octane number) of the ethanol component of the fuel to be supplied into the combustion chamber 3d is adjusted to the in-cylinder supply maximum octane number ELCMAX, the upper limit requested torque TREQLIM used to limit the output from the engine 3 is set to the maximum torque value at which the knocking of the engine 3 is reliably suppressed. Accordingly, the above effects are effectively achieved, without excessively limiting the output from the engine 3.

The gasoline G, which is the low octane number fuel, is injected into the cylinder 3a with the in-cylinder injection valve 6, the ethanol E, which is the high octane number fuel, is injected to the intake port 4a with the port injection valve 7, and the air-fuel mixture in the cylinder 3a is ignited with the ignition plug 8. In addition, the upper limit value RF2LMH of the port injection ratio RF2 is set (Steps 91 to 101 in FIG. 9), the first estimated ethanol concentration EL1E of the gasoline G is calculated, and the second estimated ethanol concentration EL2E of the ethanol E is calculated. The first and second estimated ethanol concentrations EL1E and EL2E are parameters representing the octane numbers well.

As described above, in the engine 3, the octane number of the fuel to be supplied into the cylinder 3a is varied by adjusting the ratio of the in-cylinder injection amount and the ratio of the port injection amount with respect to the sum of the in-cylinder injection amount and the port injection amount. The in-cylinder supply maximum octane number ELCMAX corresponds to the maximum value of the octane number of the fuel capable of being supplied into the cylinder 3a. Accordingly, it is possible to appropriately calculate the in-cylinder supply maximum octane number ELCMAX on the basis of the set upper limit value RF2LMH and the first and second estimated ethanol concentrations EL1E and EL2E.

Since the upper limit value RF2LMH is set on the basis of the knock strength KNOCK and the result of comparison between the ignition timing IG and the upper limit value IGLMH (Steps 93, 95 to 97, and 101), it is possible to appropriately set the upper limit value RF2LMH in accordance with the state of the knocking of the engine 3.

Since the injection hole portion of the in-cylinder injection valve 6 is exposed to the high-temperature combustion chamber 3d because the in-cylinder injection valve 6 is used to inject the gasoline G into the cylinder 3a, the deposits tend to be accumulated in the injection hole portion. The degree of accumulation of the deposits is increased with the increasing tip temperature TEDI. In addition, the tip temperature TEDI of the in-cylinder injection valve 6 is decreased with the increasing in-cylinder injection amount because the degree of cooling of the injection hole portion with the fuel is increased with the increasing in-cylinder injection amount. In contrast, since the upper limit value RF2LMH is set to a lower value when the tip temperature TEDI of the in-cylinder injection valve 6 is higher than or equal to the upper limit temperature TELMH, the in-cylinder injection amount is increased. Accordingly, it is possible to prevent the accumulation of the deposits in the injection hole portion of the in-cylinder injection valve 6.

The port injection amount capable of being injected with the port injection valve 7 is decreased with the decreasing pressure deviation DP, which is the difference in pressure between the predetermined pressure PREF of the ethanol E to be supplied and the intake air pressure PBA. Since the upper limit value RF2LMH is set to a lower value with the decreasing pressure deviation DP, it is possible to appropriately set the upper limit value RF2LMH.

The present disclosure is not limited to the embodiments described above and may be embodied in various modes. For example, although the in-cylinder supply maximum octane number ELCMAX, which is the maximum value of the ethanol concentration in the fuel capable of being supplied into the cylinder 3a, is calculated in the embodiments as the maximum octane number in the present disclosure, the maximum octane number itself may be calculated on the basis of the in-cylinder supply maximum octane number ELCMAX. Alternatively, the maximum octane number itself may be calculated on the basis of the upper limit value RF2LMH and the first and second estimated ethanol concentrations EL1E and EL2E. A calculation method using a model formula or a map may be used as the calculation method in this case.

Although the output from the internal combustion engine is limited through the decrease correction of the requested torque TREQ used to control the intake air amount in the embodiments, the output from the internal combustion engine may be limited through the decrease correction of the target intake air amount QAOBJ or through the delay-angle correction of the ignition timing. Although the knock strength KNOCK, the result of comparison between the ignition timing IG and the upper limit value IGLMH (the state of the shift of the ignition timing to the delay angle side), the tip temperature TEDI, and the pressure deviation DP are used as the setting parameters in the present disclosure for setting the upper limit value RF2LMH in the embodiments, one, two or three of them may be omitted.

Although the knock strength KNOCK is detected with the knock sensor 32 in the embodiments, the knock strength KNOCK may be calculated on the basis of the pressure in the cylinder, which has been detected with a sensor. In addition, although the result of comparison between the ignition timing IG and the upper limit value IGLMH is used in the embodiments as the state of the shift of the ignition timing to the delay angle side in the present disclosure, the ignition timing correction term COIG may be used. Although the upper limit value RF2LMH is subjected to the decrease correction when the tip temperature TEDI is higher than or equal to the upper limit temperature TELMH in the embodiments, the upper limit value RF2LMH may be set to a lower value with the increasing tip temperature TEDI.

Although the tip temperature TEDI is detected with the tip temperature sensor 36 in the embodiments, the tip temperature TEDI may be calculated on the basis of various parameters that affect the temperature of the injection hole portion of the in-cylinder injection valve 6, such as the engine rotation speed NE, the intake air amount QAIR, the ignition timing IG, the engine water temperature TW, and the injection time of the in-cylinder injection valve 6, as disclosed in Japanese Unexamined Patent Application Publication No. 2015-169184 by the same applicant, the entire contents of which are incorporated herein by reference. Although the intake air pressure PBA is detected with the intake pressure sensor 34 in the calculation of the pressure deviation DP in the embodiments, the intake air pressure PBA may be calculated on the basis of the degree of opening of the throttle valve 9 detected with a sensor or may be calculated (estimated) on the basis of the accelerator position AP.

Although the first and second ethanol concentrations EL1 and EL2 are detected with the first and second concentration sensors 39 and 40, respectively, in the embodiments, the first and second ethanol concentrations EL1 and EL2 may be estimated (calculated) in the following manner. Specifically, when the load of the internal combustion engine is within a certain low octane number determination area, only the low octane number fuel (the gasoline G) is supplied to the internal combustion engine and the ignition timing is temporarily shifted to the delay angle side from the normal ignition timing (the temporary ignition timing IGTEM) and, then, is gradually shifted to the advance angle side. The low octane number determination area is set to an area toward a low load side in the load area (hereinafter referred to as a "knocking area" in which the knocking of the internal combustion engine may occur if the ignition timing of the internal combustion engine is not controlled so as to be at the delay angle side, compared with the normal ignition timing, or if the high octane number fuel (the ethanol E) is not supplied to the internal combustion engine, in addition to the low octane number fuel. As described above, the presence of the knocking of the internal combustion engine is detected when the ignition timing is shifted to the advance angle side, the multiple operation parameters for identifying the operation state of the internal combustion engine, such as the ignition timing, the load of the internal combustion engine, the rotation speed of the internal combustion engine, and the effective compression ratio at the time when the knocking has occurred, are acquired, and the first ethanol concentration (the octane number of the low octane number fuel) is calculated (estimated) by searching a map on the basis of the acquired operation parameters.

The second ethanol concentration (the octane number of the high octane number fuel) is estimated in the following manner. Specifically, the amounts of supply of the low octane number fuel and the high octane number fuel are controlled in the same manner as in Steps 42 to 45 in FIG. 6 when the load of the internal combustion engine is within a certain high octane number determination area at a high load side of the low octane number determination area, and the ignition timing is shifted to the advance angle side from the normal ignition timing. The presence of the knocking of the internal combustion engine is detected when the ignition timing is shifted to the advance angle side, the multiple operation parameters for identifying the operation state of the internal combustion engine, such as the port injection ratio RF2, the first ethanol concentration, the ignition timing, the load of the internal combustion engine, the rotation speed of the internal combustion engine, and the effective compression ratio at the time when the knocking has occurred, are acquired, the second ethanol concentration is calculated (estimated) by searching a map on the basis of the acquired operation parameters.

Alternatively, the first and second ethanol concentrations may be estimated in the following manner in consideration of the fact that the amount of fuel injection necessary for keeping the air fuel ratio LAF at a certain value is increased with the increasing ethanol concentration (the increasing octane number) of the mixed fuel composed of the gasoline G and the ethanol E because the gasoline G has a stoichiometric mixture ratio different from that of the ethanol E. Specifically, a movement average value of the correction factor KINJ calculated on the basis of the air fuel ratio LAF described above is calculated when the load of the internal combustion engine is in a certain non-knocking area and is kept at a constant value, and the basic fuel injection amount QINJB at the time when the movement average value is calculated is multiplied by a value resulting from subtraction the port injection ratio RF2 from a value of 1.0 to calculate a first reference injection amount. The non-knocking area is set in an area at the low load side where the knocking of the internal combustion engine does not occur also when only the low octane number fuel is supplied to the internal combustion engine. The current first ethanol concentration is calculated (estimated) on the basis of the calculated movement average value, the first reference injection amount, and the previous value of the first ethanol concentration.

The second ethanol concentration (the octane number of the high octane number fuel) is estimated in the following manner. Specifically, the movement average value of the correction factor KINJ calculated on the basis of the air fuel ratio LAF described above is calculated when the load of the internal combustion engine is in the knocking area and is kept at a constant value, and the basic fuel injection amount QINJB at the time when the movement average value is calculated is set as a second reference injection amount. The current second ethanol concentration is calculated (estimated) on the basis of the calculated movement average value, the second reference injection amount, and the previous values of the first and second ethanol concentrations.

Although the first and second estimated ethanol concentrations EL1E and EL2E are calculated in the embodiments as first and second octane numbers in the present disclosure, respectively, the detected first and second ethanol concentrations EL1 and EL2 may be used or the octane numbers themselves of the gasoline G and the ethanol E may be calculated on the basis of the first and second estimated ethanol concentrations EL1E and EL2E or the first and second ethanol concentrations EL1 and EL2. Alternatively, the first and second octane numbers may be detected using a sensor that outputs a detection signal representing the octane numbers based of the first and second ethanol concentrations EL1 and EL2. The method of calculating the upper limit value RF2LMH described above in the embodiments is only an example and another appropriate calculation method may be adopted using, for example, the setting parameter, which is at least one of the knock strength of the internal combustion engine, the state of the shift of the ignition timing of the ignition plug to the delay angle side, the temperature of the injection hole portion of the first injection valve, and the difference between the pressure of the high octane number fuel to be supplied to the high octane number fuel injection valve and the pressure of the ambient atmosphere around the injection hole portion of the high octane number fuel injection valve.

The method of setting the port injection ratio RF2 and the ignition timing IG described above in the embodiments are only an example and another appropriate setting method may be adopted within the spirit and scope of the present disclosure. Although the gasoline G, which is the low octane number fuel, is injected into the cylinder 3a and the ethanol E, which is the high octane number fuel, is injected to the intake port 4a in the embodiments, the low octane number fuel may be injected to the intake port and the high octane number fuel may be injected into the cylinder. In this case, the upper limit value of the ratio in amount of the high octane number fuel is set to a higher value with the increasing temperature of the injection hole portion of the first injection valve that injects the high octane number fuel, contrary to the embodiments. Alternatively, the low octane number fuel and the high octane number fuel may be mixed in advance in a state in which the ratio of the low octane number fuel and the ratio of the high octane number fuel are adjusted and the mixed fuel may be supplied into the cylinder using a single injection valve.

Although the present disclosure is applied to the engine 3 in which the ethanol component (the high octane number component) is separated from the gasoline G, which is the low octane number fuel, to produce the ethanol E, which is the high octane number fuel, in the embodiments, the present disclosure is not limited to this. The present disclosure may be applied to an internal combustion engine in which the low octane number fuel and the high octane number fuel are externally supplied into different fuel tanks. Although the gasoline G and the ethanol E are used as the low octane number fuel and the high octane number fuel, respectively, other appropriate fuels having different octane numbers may be used.

Although the internal combustion engine of the present disclosure is the engine 3 for a vehicle in the embodiments, the internal combustion engine of the present disclosure may be an internal combustion engine for another appropriate industrial machine, for example, an internal combustion engine for a ship. While the present disclosure is described in terms of some specific examples and embodiments, it will be clear that the present disclosure is not limited to these specific examples and embodiments and that many changes and modified embodiments will be obvious to those skilled in the art without departing from the true spirit and scope of the present disclosure.

The present application describes a control apparatus 1 for an internal combustion engine 3 in which an octane number of fuel to be supplied into a cylinder 3a is varied by adjusting a ratio in amount of low octane number fuel (gasoline G in an embodiment (the same applies to SUMMAY)) and a ratio in amount of high octane number fuel (ethanol E) having the octane number greater than that of the low octane number fuel (a port injection ratio RF2) with respect to the total amount of the low octane number fuel and the high octane number fuel, which are to be supplied into the cylinder 3a. The control apparatus includes a maximum octane number calculating unit (an ECU 2 and Step 105 in FIG. 10) and an output limiting unit (the ECU 2 and Steps 106 and 108 to 111 in FIG. 10). The maximum octane number calculating unit calculates a maximum octane number (an in-cylinder supply maximum octane number ELCMAX), which is the maximum value of the octane number of fuel capable of being supplied into the cylinder 3a. The output limiting unit limits an output from the internal combustion engine 3 based on the calculated maximum octane number.

With the above configuration, the maximum octane number, which is the maximum value of the octane number of the fuel capable of being supplied into the cylinder, is calculated by the maximum octane number calculating unit and the output from the internal combustion engine is limited by the output limiting unit on the basis of the calculated maximum octane number. The knocking of the internal combustion engine tends to increase with the increasing output. Accordingly, it is possible to avoid an occurrence of a situation in which the octane number is not capable of being adjusted to a magnitude at which the knocking is capable of being suppressed, unlike the control apparatus in the related art described above, by limiting the output from the internal combustion engine so as to be reduced with the decreasing maximum octane number of the fuel to be actually supplied into the cylinder with the output limiting unit and it is possible to appropriately suppress the knocking of the internal combustion engine.

In the control apparatus 1 for the internal combustion engine 3, the internal combustion engine 3 may include a first injection valve (an in-cylinder injection valve 6) that injects one of the low octane number fuel and the high octane number fuel into the cylinder 3a, a second injection valve (a port injection valve 7) that injects the other of the low octane number fuel and the high octane number fuel to an intake port 4a and an ignition plug 8 that ignites air-fuel mixture in the cylinder 3a. The control apparatus 1 may further include a setting parameter acquiring unit (a knock sensor 32, an intake pressure sensor 34, a tip temperature sensor 36, the ECU 2, and Steps 91 and 95 in FIG. 9), an upper limit value setting unit (the ECU 2 and Steps 92, 93, 96, 97, and 99 to 101 in FIG. 9), a first octane number acquiring unit (a first concentration sensor 39, the ECU 2, and Step 2 in FIG. 3), and a second octane number acquiring unit (a second concentration sensor 40, the ECU 2, and Step 3 in FIG. 3). The setting parameter acquiring unit acquires a setting parameter, which is at least one of knock strength KNOCK of the internal combustion engine 3, the state of shift of ignition timing IG of the ignition plug 8 to an delay angle side for suppressing the knocking of the internal combustion engine 3, the temperature of an injection hole portion of the first injection valve (a tip temperature TEDI), and a difference (pressure deviation DP) between pressure (predetermined pressure PREF) of the high octane number fuel to be supplied to a high octane number fuel injection valve (the port injection valve 7) that injects the high octane number fuel, among the first injection valve and the second injection valve, and pressure (intake air pressure PBA) of ambient atmosphere around an injection hole portion of the high octane number fuel injection valve. The upper limit value setting unit sets an upper limit value RF2LMH of the ratio in amount of the high octane number fuel in accordance with the acquired setting parameter. The first octane number acquiring unit acquires a first octane number (first estimated ethanol concentration EL1E) indicating the octane number of the low octane number fuel. The second octane number acquiring unit acquires a second octane number (second estimated ethanol concentration EL2E) indicating the octane number of the high octane number fuel. The maximum octane number calculating unit may calculate the maximum octane number based on the set upper limit value RF2LMH and the acquired first and second octane numbers.

With the above configuration, one of the low octane number fuel and the high octane number fuel is injected into the cylinder with the first injection valve, the other of the low octane number fuel and the high octane number fuel is injected to the intake port with the second injection valve, and the air-fuel mixture in the cylinder is ignited with the ignition plug. In addition, the upper limit value of the ratio in amount of the high octane number fuel is set with the upper limit value setting unit, the first octane number indicating the octane number of the low octane number fuel is acquired with the first octane number acquiring unit, and the second octane number indicating the octane number of the high octane number fuel is acquired with the second octane number acquiring unit.

As described above, in the internal combustion engine, the octane number of the fuel to be supplied into the cylinder is varied by adjusting the ratio in amount of the low octane number fuel and the ratio in amount of the high octane number fuel with respect to the total amount of the low octane number fuel and the high octane number fuel, which are to be supplied into the cylinder, and the maximum octane number corresponds to the maximum value of the octane number of the fuel capable of being supplied into the cylinder. Accordingly, it is possible to appropriately calculate the maximum octane number on the basis of the set upper limit value of the ratio in amount of the high octane number fuel and the first and second octane numbers (the octane numbers of the low octane number fuel and the high octane number fuel).

In addition, in the internal combustion engine of such a type, the high octane number fuel is used to suppress the knocking of the internal combustion engine. Accordingly, it is possible to appropriately set the upper limit value of the ratio in amount of the high octane number fuel in accordance with the state of the knocking of the internal combustion engine by using at least one of the knock strength of the internal combustion engine and the state of shift of the ignition timing of the ignition plug to the delay angle side for suppressing the knocking of the internal combustion engine as the setting parameter for setting the upper limit value of the ratio in amount of the high octane number fuel.

Since the injection hole portion of the first injection valve is exposed to the high-temperature cylinder (combustion chamber) because the first injection valve injects one of the low octane number fuel and the high octane number fuel into the cylinder, deposits tend to be accumulated in the injection hole portion. The degree of accumulation of the deposits is increased with the increasing temperature of the injection hole portion. In addition, since the injection hole portion of the first injection valve is cooled with the injected fuel, the temperature of the injection hole portion is varied with the amount of fuel that is injected. Accordingly, it is possible to prevent the accumulation of the deposits in the injection hole portion of the first injection valve by using the temperature of the injection hole portion of the first injection valve for the setting of the upper limit value of the ratio in amount of the high octane number fuel.

The amount of injection of the high octane number fuel capable of being injected with the high octane number fuel injection valve is varied with the difference between the pressure of the high octane number fuel that is supplied and the pressure of ambient atmosphere around the injection hole portion of the high octane number fuel injection valve. Accordingly, it is possible to appropriately set the upper limit value of the ratio in amount of the high octane number fuel by using the difference in pressure as the setting parameter.

Obviously, numerous modifications and variations of the present invention are possible in light of the above teachings. It is therefore to be understood that within the scope of the appended claims, the invention may be practiced otherwise than as specifically described herein.

What is claimed is:

1. A control apparatus for an internal combustion engine in which an octane number of fuel to be supplied into a cylinder is varied by adjusting a ratio of an amount of low octane number fuel to a total amount of the low octane number fuel and an amount of high octane number fuel having the octane number greater than that of the low octane number fuel, which are to be supplied into the cylinder, the control apparatus comprising:

a maximum octane number calculating unit that is configured to calculate a maximum octane number, which is a maximum value of the octane number of fuel capable of being supplied into the cylinder; and an output limiting unit that is configured to limit an output from the internal combustion engine based on the calculated maximum octane number.

2. The control apparatus according to claim 1, wherein the internal combustion engine includes a first injection valve that is configured to inject one of the low octane number fuel and the high octane number fuel into the cylinder, a second injection valve that is configured to inject the other of the low octane number fuel and the high octane number fuel to an intake port, and an ignition plug that is configured to ignite air-fuel mixture in the cylinder, the control apparatus further comprising:

a setting parameter acquiring unit that is configured to acquire a setting parameter, which is at least one of knock strength of the internal combustion engine, a state of shift of ignition timing of the ignition plug to an delay angle side for suppressing knocking of the internal combustion engine, a temperature of an injection hole portion of the first injection valve, and a difference between pressure of the high octane number fuel to be supplied to a high octane number fuel injection valve that is configured to inject the high octane number fuel, among the first injection valve and the second injection valve, and pressure of ambient atmosphere around an injection hole portion of the high octane number fuel injection valve;

an upper limit value setting unit that is configured to set an upper limit value of the ratio in amount of the high octane number fuel in accordance with the acquired setting parameter;

a first octane number acquiring unit that is configured to acquire a first octane number indicating the octane number of the low octane number fuel; and a second octane number acquiring unit that is configured to acquire a second octane number indicating the octane number of the high octane number fuel, wherein the maximum octane number calculating unit is configured to calculate the maximum octane number based on the set upper limit value and the acquired first and second octane numbers.

3. The control apparatus according to claim 1, wherein the control apparatus is configured to adjust a ratio of the amount of the high octane number fuel to the total amount in order to control the ratio of the amount of the low octane number fuel to the total amount.

4. The control apparatus according to claim 1, wherein the output limiting unit is configured to limit the output from the internal combustion engine based on the maximum octane number and a rotation speed of the internal combustion engine.

5. A control apparatus for an internal combustion engine, comprising:

circuitry configured to control a ratio of an amount of low octane number fuel to be supplied to a cylinder to a total amount of the low octane number fuel and a high octane number fuel to be supplied to the cylinder in order to control an overall octane number of fuel to be supplied to the cylinder, the high octane number fuel having a second octane number higher than a first octane number of the low octane number fuel;

calculate a maximum octane number of the fuel to be supplied into the cylinder; and restrict a power generated by the internal combustion engine based on the maximum octane number.

6. The control apparatus according to claim 5, wherein the internal combustion engine includes a first injection valve that is configured to inject one of the low octane number fuel and the high octane number fuel into the cylinder, a second injection valve that is configured to inject the other of the low octane number fuel and the high octane number fuel to an intake port, and an ignition plug that is configured to ignite air-fuel mixture in the cylinder, wherein the control apparatus further comprises:

a setting parameter acquirer to acquire a setting parameter, which is at least one of knock strength of the internal combustion engine, a state of shift of ignition timing of the ignition plug to an delay angle side for suppressing knocking of the internal combustion engine, a temperature of an injection hole portion of the first injection valve, and a difference between pressure of the high octane number fuel to be supplied to a high octane number fuel injection valve that is configured to inject the high octane number fuel, among the first injection valve and the second injection valve, and pressure of ambient atmosphere around an injection hole portion of the high octane number fuel injection valve;

a first octane number acquirer to acquire the first octane number; and a second octane number acquirer to acquire the second octane number, wherein the circuitry is configured to set an upper limit value of the second ratio in amount of the high octane number fuel in accordance with the acquired setting parameter; and calculate the maximum octane number based on the set upper limit value and the acquired first and second octane numbers.

7. The control apparatus according to claim 5, wherein the circuitry is configured to control a ratio of the amount of the high octane number fuel to the total amount in order to control the ratio of the amount of the low octane number fuel to the total amount.

8. The control apparatus according to claim 5, wherein the circuitry is configured to restrict the power generated by the internal combustion engine based on the maximum octane number and a rotation speed of the internal combustion engine.

9. A control apparatus for an internal combustion engine, comprising:

a controller to control a ratio of an amount of low octane number fuel to be supplied to a cylinder to a total amount of the low octane number fuel and a high octane number fuel to be supplied to the cylinder in order to control an overall octane number of fuel to be supplied to the cylinder, the high octane number fuel having a second octane number higher than a first octane number of the low octane number fuel;

a calculator to calculate a maximum octane number of the fuel to be supplied into the cylinder; and a power controller to restrict a power generated by the internal combustion engine based on the maximum octane number.

10. The control apparatus according to claim 9, wherein the control apparatus is configured to adjust a ratio of the amount of the high octane number fuel to the total amount in order to control the ratio of the amount of the low octane number fuel to the total amount.

11. The control apparatus according to claim 9, wherein the power controller is configured to restrict the power generated by the internal combustion engine based on the maximum octane number and a rotation speed of the internal combustion engine.

\* \* \* \* \*